United States Patent
Gasda et al.

(10) Patent No.: US 12,136,756 B1
(45) Date of Patent: Nov. 5, 2024

(54) METHOD OF MAKING A FUEL CELL STACK WITH STRESS REDUCING SEALS

(71) Applicant: BLOOM ENERGY CORPORATION, San Jose, CA (US)

(72) Inventors: Michael D. Gasda, Sunnyvale, CA (US); Madhuri Nallabolu, Fremont, CA (US); Brian Therault, San Jose, CA (US); Robert Hintz, San Jose, CA (US); Hoa Vo, San Jose, CA (US); Phuc Phan, San Jose, CA (US); Patrick Nikong, Mountain View, CA (US); Greg Young, Santa Cruz, CA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 466 days.

(21) Appl. No.: 17/206,790

(22) Filed: Mar. 19, 2021

Related U.S. Application Data

(60) Provisional application No. 63/003,960, filed on Apr. 2, 2020.

(51) Int. Cl.
  *H01M 8/248* (2016.01)
  *H01M 8/0265* (2016.01)
  *H01M 8/0273* (2016.01)
  *H01M 8/0282* (2016.01)

(52) U.S. Cl.
  CPC ......... *H01M 8/248* (2013.01); *H01M 8/0265* (2013.01); *H01M 8/0273* (2013.01); *H01M 8/0282* (2013.01)

(58) Field of Classification Search
  None
  See application file for complete search history.

(56) References Cited

U.S. PATENT DOCUMENTS

| | | | | |
|---|---|---|---|---|
| 4,761,364 | A * | 8/1988 | Schmauder | G03F 7/12 430/320 |
| 8,067,129 | B2 | 11/2011 | Couse | |
| 8,110,319 | B2 | 2/2012 | Nguyen et al. | |
| 8,268,502 | B2 | 9/2012 | Nguyen et al. | |

(Continued)

FOREIGN PATENT DOCUMENTS

| | | |
|---|---|---|
| JP | 2007-161569 A | 6/2007 |
| WO | WO 2002-39528 A2 | 5/2002 |

OTHER PUBLICATIONS

Orera et al, Fabrication methods and performance in fuel cell and steam electrolysis operation modes of small tubular solid oxide fuel cells: a review, Front. Energy Res., Jun. 25, 2014 (Year: 2014).*

(Continued)

*Primary Examiner* — Ula C Ruddock
*Assistant Examiner* — Mary Grace Byram
(74) *Attorney, Agent, or Firm* — THE MARBURY LAW GROUP PLLC

(57) ABSTRACT

A method of assembling a fuel cell stack includes depositing a liquid seal material on an interconnect, pressing a fuel cell into the liquid seal material, and solidifying the liquid seal material after pressing the fuel cell into the liquid seal material. The seal material may also include a support portion or extensions which are configured to reduce an amount of compressive stress on corners of the fuel cell in the fuel cell stack.

12 Claims, 8 Drawing Sheets

(56) References Cited

U.S. PATENT DOCUMENTS

| | | |
|---|---|---|
| 8,445,157 B2 | 5/2013 | Nguyen et al. |
| 8,785,074 B2 | 7/2014 | Edmonston et al. |
| 8,852,825 B2 | 10/2014 | Batawi et al. |
| 8,986,905 B2 | 3/2015 | McElroy et al. |
| 9,065,127 B2 | 6/2015 | Gottmann et al. |
| 9,246,184 B1 | 1/2016 | Batawi et al. |
| 9,368,810 B2 | 6/2016 | Darga et al. |
| 9,452,475 B2 | 9/2016 | Armstrong et al. |
| 9,461,314 B2 | 10/2016 | McElroy |
| 9,468,736 B2 | 10/2016 | Darga et al. |
| 9,570,769 B2 | 2/2017 | Couse et al. |
| 9,583,771 B2 | 2/2017 | Parihar et al. |
| 9,634,335 B2 | 4/2017 | Ashary |
| 9,673,457 B2 | 6/2017 | Srivatsan et al. |
| 9,993,874 B2 | 6/2018 | Shivanath et al. |
| 10,079,393 B1 | 9/2018 | Verma et al. |
| 10,763,533 B1 | 9/2020 | El Batawi et al. |
| 2003/0150162 A1* | 8/2003 | Inagaki ............... H01M 8/0297 48/195 |
| 2006/0127736 A1* | 6/2006 | Koch .................. F16J 15/123 429/480 |
| 2006/0141324 A1* | 6/2006 | Kelley ................ H01M 8/0282 277/654 |
| 2009/0130521 A1* | 5/2009 | Fujii ..................... H01M 8/006 429/454 |
| 2009/0136821 A1 | 5/2009 | Gottmann et al. |
| 2009/0226786 A1* | 9/2009 | Selcuk ................. H01M 8/028 429/495 |
| 2011/0129756 A1 | 6/2011 | Erikstrup |
| 2012/0155062 A1 | 5/2012 | Nguyen et al. |
| 2013/0130146 A1 | 5/2013 | Batawi et al. |
| 2013/0216927 A1 | 8/2013 | Gottmann et al. |
| 2013/0230644 A1 | 9/2013 | Armstrong et al. |
| 2013/0230792 A1 | 9/2013 | Wilson et al. |
| 2014/0057184 A1 | 2/2014 | Pillai et al. |
| 2014/0127602 A1* | 5/2014 | Srivatsan ............ H01M 8/0258 429/535 |
| 2014/0342267 A1 | 11/2014 | Parihar et al. |
| 2015/0132679 A1 | 5/2015 | McElroy |
| 2015/0147679 A1 | 5/2015 | Darga et al. |
| 2015/0194682 A1 | 7/2015 | Ashary |
| 2015/0244004 A1 | 8/2015 | Shivanath et al. |
| 2018/0097250 A1 | 4/2018 | Brown |
| 2019/0157689 A1* | 5/2019 | Noh .................... H01M 8/1226 |
| 2019/0372132 A1 | 12/2019 | Gasda et al. |

OTHER PUBLICATIONS

Notification of Transmittal of the International Search Report and Written Opinion of the International Search Authority for International Patent Application No. PCT/US2019/034283, mailed Oct. 1, 2019, 10 pages.

* cited by examiner

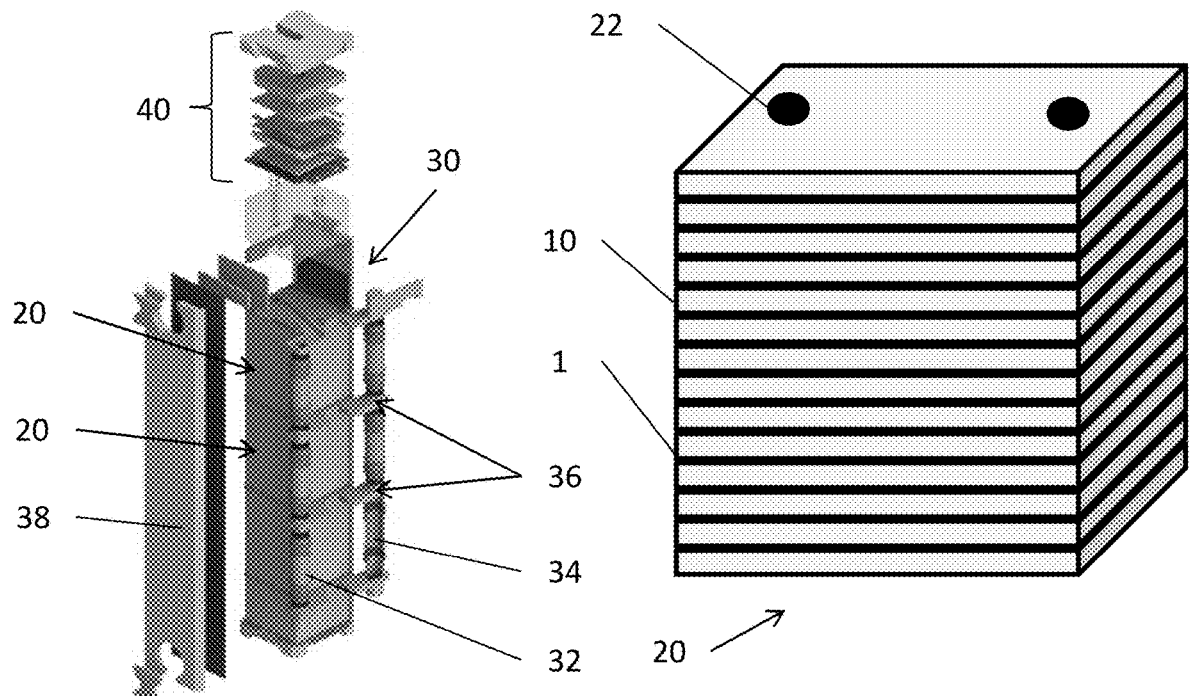
FIG. 1A
(Related Art)
FIG. 1B
(Related Art)
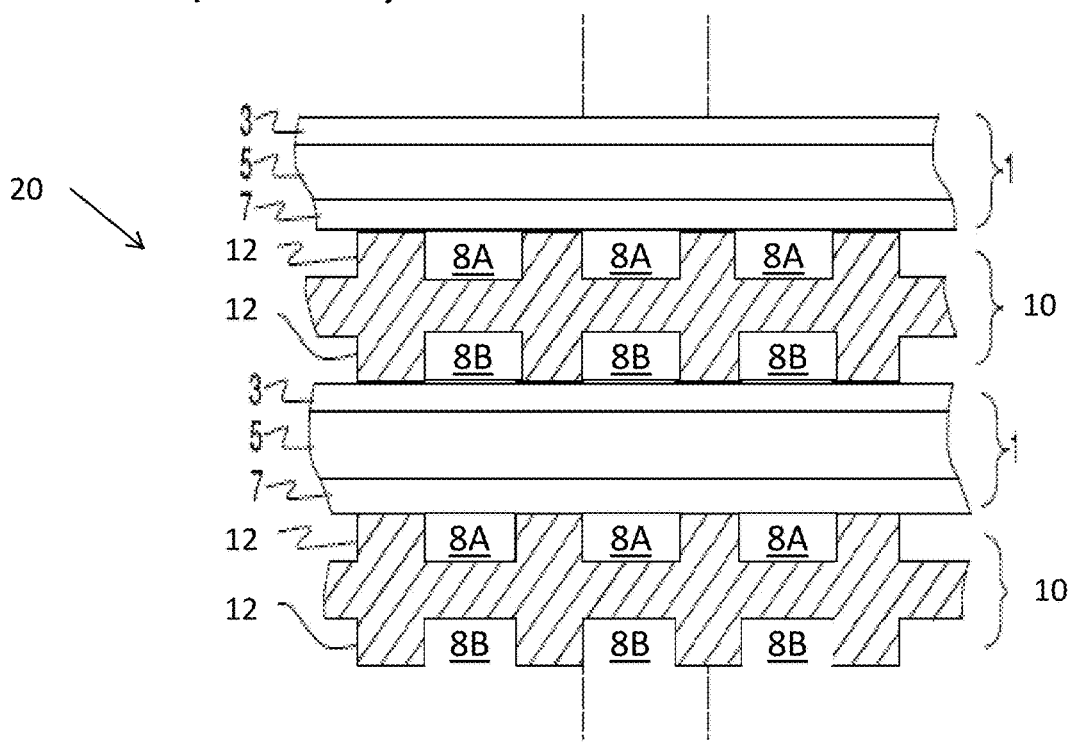
FIG. 1C
(Related Art)

METHOD OF MAKING A FUEL CELL STACK WITH STRESS REDUCING SEALS

FIELD

The present disclosure is directed to fuel cell stacks in general and to a method of making fuel cell stacks using stress reducing seals in particular.

BACKGROUND

In a high temperature fuel cell system, such as a solid oxide fuel cell (SOFC) system, an oxidizing flow is passed through the cathode side of the fuel cell while a fuel flow is passed through the anode side of the fuel cell. The oxidizing flow is typically air, while the fuel flow can be a hydrocarbon fuel, such as methane, natural gas, pentane, ethanol, or methanol. The fuel cell, operating at a typical temperature between 750° C. and 950° C., enables the transport of negatively charged oxygen ions from the cathode flow stream to the anode flow stream, where the ion combines with either free hydrogen or hydrogen in a hydrocarbon molecule to form water vapor and/or with carbon monoxide to form carbon dioxide. The excess electrons from the negatively charged ion are routed back to the cathode side of the fuel cell through an electrical circuit completed between anode and cathode, resulting in an electrical current flow through the circuit.

Fuel cell stacks may be either internally or externally manifolded for fuel and air. In internally manifolded stacks, the fuel and air is distributed to each cell using risers contained within the stack. In other words, the gas flows through openings or holes in the supporting layer of each fuel cell, such as the electrolyte layer, and gas flow separator of each cell. In externally manifolded stacks, the stack is open on the fuel and air inlet and outlet sides, and the fuel and air are introduced and collected independently of the stack hardware. For example, the inlet and outlet fuel and air flow in separate channels between the stack and the manifold housing in which the stack is located.

Fuel cell stacks are frequently built from a multiplicity of cells in the form of planar elements, tubes, or other geometries. Fuel and air has to be provided to the electrochemically active surface, which can be large. One component of a fuel cell stack is the so called gas flow separator (referred to as a gas flow separator plate in a planar stack) that separates the individual cells in the stack. The gas flow separator plate separates fuel, such as hydrogen or a hydrocarbon fuel, flowing to the fuel electrode (i.e., anode) of one cell in the stack from oxidant, such as air, flowing to the air electrode (i.e., cathode) of an adjacent cell in the stack. Frequently, the gas flow separator plate is also used as an interconnect which electrically connects the fuel electrode of one cell to the air electrode of the adjacent cell. In this case, the gas flow separator plate which functions as an interconnect is made of or contains an electrically conductive material.

SUMMARY

According to one embodiment of the present disclosure, a method of assembling a fuel cell stack comprises providing a cross-flow first interconnect comprising fuel holes that extend through the interconnect, fuel channels that extend in a first direction on a fuel side of the interconnect, and air channels that extend on an air side of the interconnect in a second direction substantially perpendicular to the first direction, depositing a seal material on the air side of the first interconnect to form riser seals that surround the fuel holes, depositing the seal material on the fuel side of the first interconnect to form a perimeter seal that surrounds the fuel channels and the fuel holes, positioning a first side of a first fuel cell on the air side of the first interconnect in contact with the riser seals, placing a cross-flow second interconnect into the fuel cell stack facing a second side of the first fuel cell, positioning a second side of a second fuel cell on the fuel side of the first interconnect in contact with the perimeter seal, placing a cross-flow third interconnect into the fuel cell stack facing a first side of the second fuel cell, and sintering the fuel cell stack to reflow the riser seals and the perimeter seal. The riser seals, the perimeter seal, or both the riser seals and the perimeter seal comprise at least one of at least one support portion or extensions which are configured to reduce an amount of compressive stress on corners of at least one of the first or second fuel cells in the fuel cell stack.

According to another embodiment of the present disclosure, a method of assembling a fuel cell stack includes depositing a liquid seal material on an interconnect, pressing a fuel cell into the liquid seal material, and solidifying the liquid seal material after pressing the fuel cell into the liquid seal material.

BRIEF DESCRIPTION OF THE DRAWINGS

The accompanying drawings, which are incorporated herein and constitute part of this specification, illustrate example embodiments of the invention, and together with the general description given above and the detailed description given below, serve to explain the features of the invention.

FIG. 1A is a perspective view of a conventional fuel cell column, FIG. 1B is a perspective view of one counter-flow solid oxide fuel cell (SOFC) stack included in the column of FIG. 1A, and FIG. 1C is a side cross-sectional view of a portion of the stack of FIG. 1B.

DETAILED DESCRIPTION

Figure 2A:
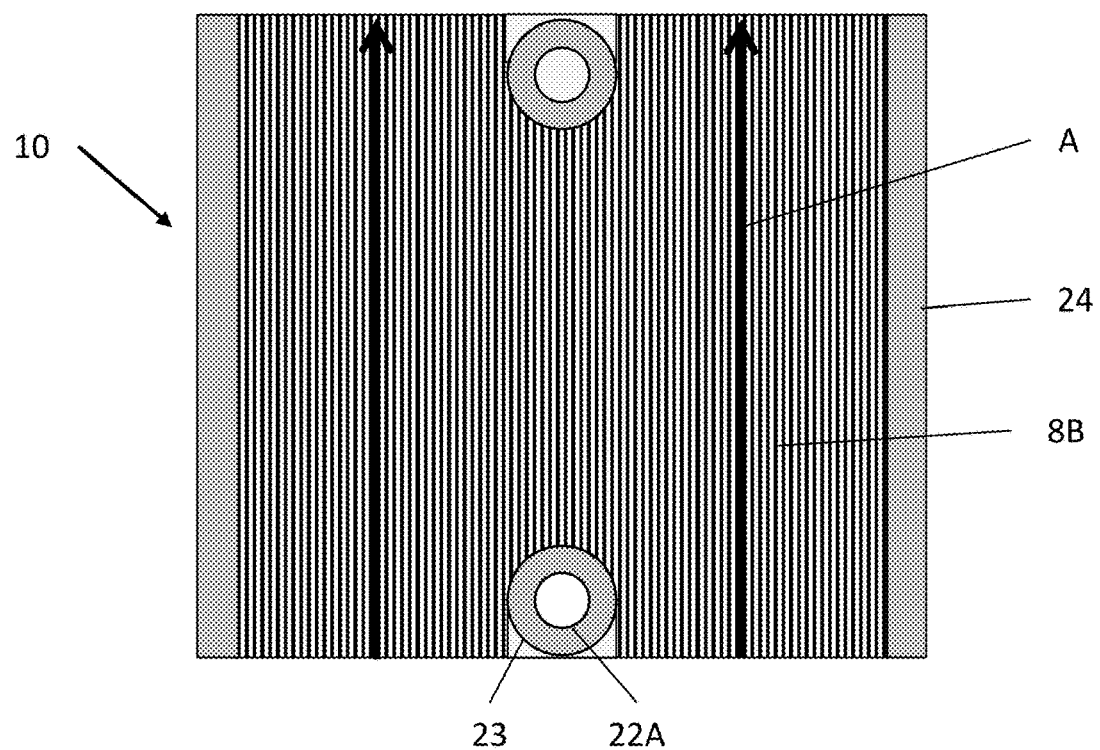
FIG. 2A is a top view of the air side of a conventional interconnect of the stack of FIG. 1B.

The various embodiments will be described in detail with reference to the accompanying drawings. The drawings are not necessarily to scale, and are intended to illustrate various features of the invention. Wherever possible, the same reference numbers will be used throughout the drawings to refer to the same or like parts. References made to particular examples and implementations are for illustrative purposes, and are not intended to limit the scope of the invention or the claims.

Ranges can be expressed herein as from "about" one particular value, and/or to "about" another particular value. When such a range is expressed, examples include from the one particular value and/or to the other particular value. Similarly, when values are expressed as approximations, by use of the antecedent "about" or "substantially" it will be understood that the particular value forms another aspect. In some embodiments, a value of "about X" may include values of +/−1% X. It will be further understood that the endpoints of each of the ranges are significant both in relation to the other endpoint, and independently of the other endpoint.

FIG. 1A is a perspective view of a conventional fuel cell column 30, FIG. 1B is a perspective view of one counter-flow solid oxide fuel cell (SOFC) stack 20 included in the column 30 of FIG. 1A, and FIG. 1C is a side cross-sectional view of a portion of the stack 20 of FIG. 1B.

Referring to FIGS. 1A and 1B, the column 30 may include one or more stacks 20, a fuel inlet conduit 32, an anode exhaust conduit 34, and anode feed/return assemblies 36 (e.g., anode splitter plates (ASP's) 36). The column 30 may also include side baffles 38 and a compression assembly 40. The fuel inlet conduit 32 is fluidly connected to the ASP's 36 and is configured to provide the fuel feed to each ASP 36, and anode exhaust conduit 34 is fluidly connected to the ASP's 36 and is configured to receive anode fuel exhaust from each ASP 36.

The ASP's 36 are disposed between the stacks 20 and are configured to provide a hydrocarbon fuel containing fuel feed to the stacks 20 and to receive anode fuel exhaust from the stacks 20. For example, the ASP's 36 may be fluidly connected to internal fuel riser channels 22 formed in the stacks 20, as discussed below.

Referring to FIG. 1C, the stack 20 includes multiple fuel cells 1 that are separated by interconnects 10, which may also be referred to as gas flow separator plates or bipolar plates. Each fuel cell 1 includes a cathode electrode 3, a solid oxide electrolyte 5, and an anode electrode 7.

Each interconnect 10 electrically connects adjacent fuel cells 1 in the stack 20. In particular, an interconnect 10 may electrically connect the anode electrode 7 of one fuel cell 1 to the cathode electrode 3 of an adjacent fuel cell 1. FIG. 1C shows that the lower fuel cell 1 is located between two interconnects 10.

Each interconnect 10 includes ribs 12 that at least partially define fuel channels 8A and air channels 8B. The interconnect 10 may operate as a gas-fuel separator that separates a fuel, such as a hydrocarbon fuel, flowing to the fuel electrode (i.e. anode 7) of one cell in the stack from oxidant, such as air, flowing to the air electrode (i.e. cathode 3) of an adjacent cell in the stack. At either end of the stack 20, there may be an air end plate or fuel end plate (not shown) for providing air or fuel, respectively, to the end electrode.

Figure 2B:
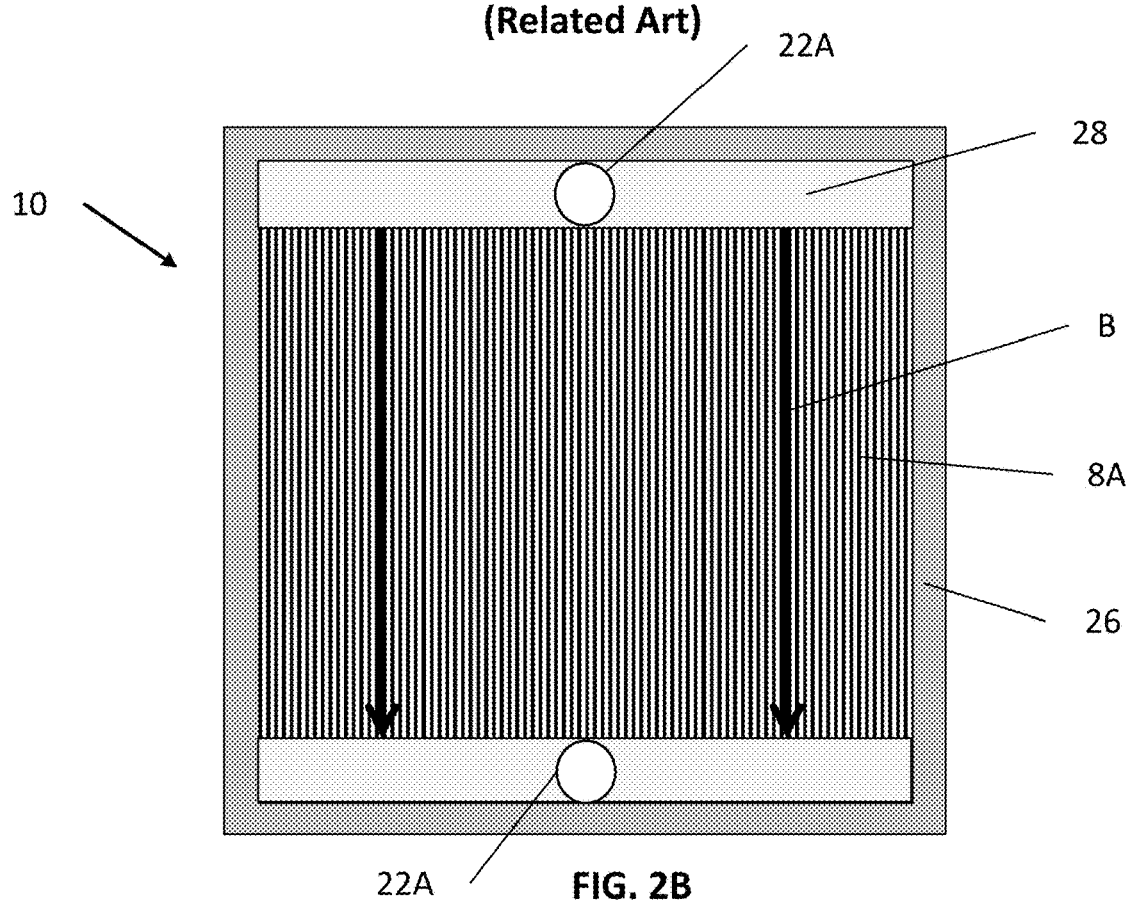
FIG. 2B is a top view of the fuel side of the conventional interconnect.

FIG. 2A is a top view of the air side of the conventional interconnect 10, and FIG. 2B is a top view of a fuel side of the interconnect 10. Referring to FIGS. 1C and 2A, the air side includes the air channels 8B. Air flows through the air channels 8B to a cathode electrode 3 of an adjacent fuel cell 1. In particular, the air may flow across the interconnect 10 in a first direction A as indicated by the arrows.

Ring seals 23 may surround fuel holes 22A of the interconnect 10, to prevent fuel from contacting the cathode electrode. Peripheral strip-shaped seals 24 are located on peripheral portions of the air side of the interconnect 10. The seals 23, 24 may be formed of a glass material. The peripheral portions may be in the form of an elevated plateau which does not include ribs or channels. The surface of the peripheral regions may be coplanar with tops of the ribs 12.

Referring to FIGS. 1C and 2B, the fuel side of the interconnect 10 may include the fuel channels 8A and fuel manifolds 28 (e.g., fuel plenums). Fuel flows from one of the fuel holes 22A, into the adjacent manifold 28, through the fuel channels 8A, and to an anode 7 of an adjacent fuel cell 1. Excess fuel may flow into the other fuel manifold 28 and then into the adjacent fuel hole 22A. In particular, the fuel may flow across the interconnect 10 in a second direction B, as indicated by the arrows. The second direction B may be perpendicular to the first direction A (see FIG. 2A).

A frame-shaped seal 26 is disposed on a peripheral region of the fuel side of the interconnect 10. The peripheral region may be an elevated plateau which does not include ribs or channels. The surface of the peripheral region may be coplanar with tops of the ribs 12.

Accordingly, a conventional counter-flow fuel cell column, as shown in FIGS. 1A, 1B, 1C, 2A, and 2B, may include complex fuel distribution systems (fuel rails and anode splitter plates). In addition, the use of an internal fuel riser may require holes in fuel cells and corresponding seals, which may reduce an active area thereof and may cause cracks in the ceramic electrolytes of the fuel cells 1.

The fuel manifolds 28 may occupy a relatively large region of the interconnect 10, which may reduce the contact area between the interconnect 10 and an adjacent fuel cell by approximately 10%. The fuel manifolds 28 are also relatively deep, such that the fuel manifolds 28 represent relatively thin regions of the interconnect 10. Since the interconnect 10 is generally formed by a powder metallurgy compaction process, the density of fuel manifold regions may approach the theoretical density limit of the interconnect material. As such, the length of stroke of a compaction press used in the compaction process may be limited due to the high-density fuel manifold regions being incapable of being compacted further. As a result, the density achieved elsewhere in the interconnect 10 may be limited to a lower level by the limitation to the compaction stroke. The resultant density variation may lead to topographical variations, which may reduce the amount of contact between the interconnect 10 a fuel cell 1 and may result in lower stack yield and/or performance.

Another important consideration in fuel cell system design is in the area of operational efficiency. Maximizing fuel utilization is a key factor to achieving operational efficiency. Fuel utilization is the ratio of how much fuel is consumed during operation, relative to how much is delivered to a fuel cell. An important factor in preserving fuel cell cycle life may be avoiding fuel starvation in fuel cell active areas, by appropriately distributing fuel to the active areas. If there is a maldistribution of fuel such that some flow field channels receive insufficient fuel to support the electrochemical reaction that would occur in the region of that channel, it may result in fuel starvation in fuel cell areas adjacent that channel. In order to distribute fuel more uniformly, conventional interconnect designs include channel depth variations across the flow field. This may create complications not only in the manufacturing process, but may also require complex metrology to measure these dimensions accurately. The varying channel geometry may be constrained by the way fuel is distributed through fuel holes and distribution manifolds.

One possible solution to eliminate this complicated geometry and the fuel manifold is to have a wider fuel opening to ensure much more uniform fuel distribution across the fuel flow field. Since fuel manifold formation is a factor in density variation, elimination of fuel manifolds should enable more uniform interconnect density and permeability. Accordingly, there is a need for improved interconnects that provide for uniform contact with fuel cells, while also uniformly distributing fuel to the fuel cells without the use of conventional fuel manifolds.

Owing to the overall restrictions in expanding the size of a hotbox of a fuel cell system, there is also a need for improved interconnects designed to maximize fuel utilization and fuel cell active area, without increasing the footprint of a hotbox.

Cross-Flow Fuel Cell Systems

Figure 3A:
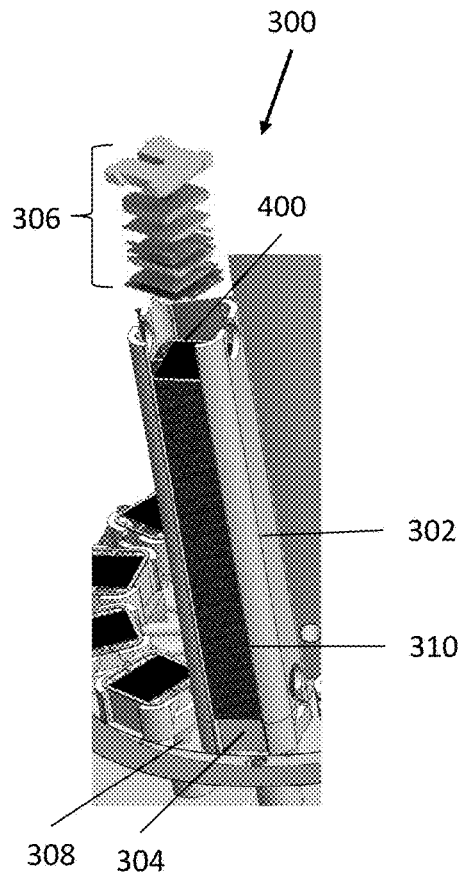
FIG. 3A is a perspective view of a fuel cell stack, according to various embodiments of the present disclosure.
Figure 3D:
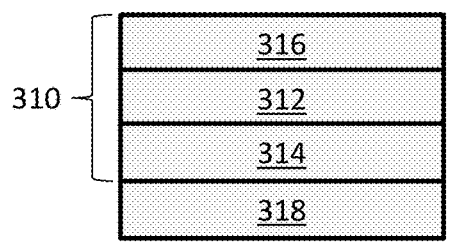
FIG. 3D is a schematic view of a fuel cell included in the stack of FIG. 3A.
Figure 3C:
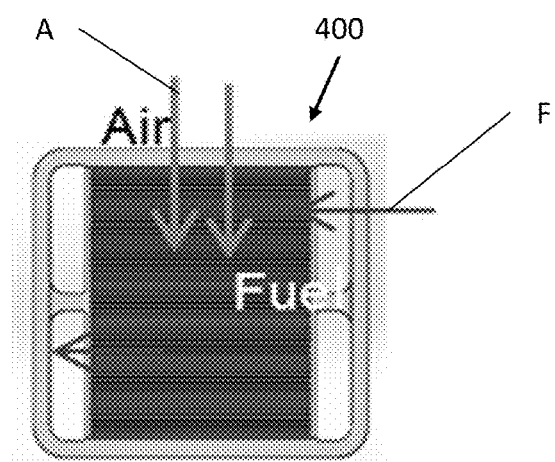
FIG. 3C is a top view of the fuel side of an interconnect included in the stack of FIG. 3A.
Figure 3B:
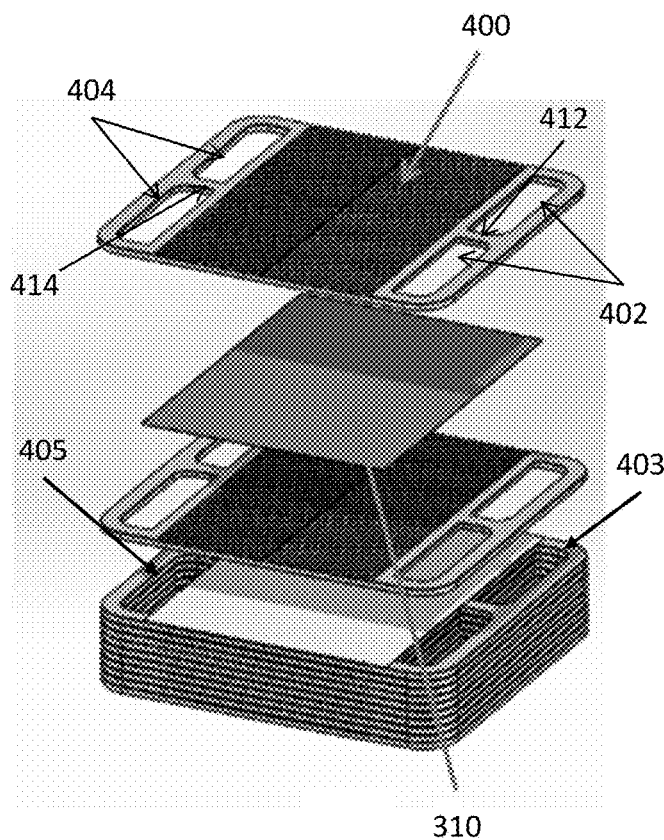
FIG. 3B is an exploded perspective view of a portion of the stack of FIG. 3A.

FIG. 3A is a perspective view of a fuel cell stack 300, according to various embodiments of the present disclosure, FIG. 3B is an exploded perspective view of a portion of the stack 300 of FIG. 3A, FIG. 3C is a top view of the fuel side of an interconnect 400 included in the stack 300, and FIG. 3D is a schematic view of a fuel cell included in the stack 300.

Referring to FIGS. 3A-3D, the fuel cell stack 300, which may also be referred to as a fuel cell column because it lacks ASP's, includes multiple fuel cells 310 that are separated by interconnects 400, which may also be referred to as gas flow separator plates or bipolar plates. One or more stacks 300 may be thermally integrated with other components of a fuel cell power generating system (e.g., one or more anode tail gas oxidizers, fuel reformers, fluid conduits and manifolds, etc.) in a common enclosure or "hotbox."

The interconnects 400 are made from an electrically conductive metal material. For example, the interconnects 400 may comprise a chromium alloy, such as a Cr—Fe alloy. The interconnects 400 may typically be fabricated using a powder metallurgy technique that includes pressing and sintering a Cr—Fe powder, which may be a mixture of Cr and Fe powders or an Cr—Fe alloy powder, to form a Cr—Fe interconnect in a desired size and shape (e.g., a "net shape" or "near net shape" process). A typical chromium-alloy interconnect 400 comprises more than about 90% chromium by weight, such as about 94-96% (e.g., 95%) chromium by weight. An interconnect 400 may also contain less than about 10% iron by weight, such as about 4-6% (e.g., 5%) iron by weight, may contain less than about 2% by weight, such as about zero to 1% by weight, of other materials, such as yttrium or yttria, as well as residual or unavoidable impurities.

Each fuel cell 310 may include a solid oxide electrolyte 312, an anode 314, and a cathode 316. In some embodiments, the anode 314 and the cathode 316 may be printed on the electrolyte 312. In other embodiments, a conductive layer 318, such as a nickel mesh, may be disposed between the anode 314 and an adjacent interconnect 400. The fuel cell 310 does not include through holes, such as the fuel holes of conventional fuel cells. Therefore, the fuel cell 310 avoids cracks that may be generated due to the presence of such through holes.

An upper most interconnect 400 and a lowermost interconnect 400 of the stack 300 may be different ones of an air end plate or fuel end plate including features for providing air or fuel, respectively, to an adjacent end fuel cell 310. As used herein, an "interconnect" may refer to either an interconnect located between two fuel cells 310 or an end plate located at an end of the stack and directly adjacent to only one fuel cell 310. Since the stack 300 does not include ASPs and the end plates associated therewith, the stack 300 may include only two end plates. As a result, stack dimensional variations associated with the use of intra-column ASPs may be avoided.

The stack 300 may include side baffles 302, a fuel plenum 304, and a compression assembly 306. The side baffles 302 may be formed of a ceramic material and may be disposed on opposing sides of the fuel cell stack 300 containing stacked fuel cells 310 and interconnects 400. The side baffles 302 may connect the fuel plenum 304 and the compression assembly 306, such that the compression assembly 306 may apply pressure to the stack 300. The side baffles 302 may be curved baffle plates, such each baffle plate covers at least portions of three sides of the fuel cell stack 300. For example, one baffle plate may fully cover the fuel inlet riser side of the stack 300 and partially covers the adjacent front and back sides of the stack, while the other baffle plate fully covers the fuel outlet riser side of the stack and partially covers the adjacent portions of the front and back sides of the stack. The remaining uncovered portions for the front and back sides of the stack allow the air to flow through the stack 300. The curved baffle plates provide an improved air flow control through the stack compared to the conventional baffle plates 38 which cover only one side of the stack. The fuel plenum 304 may be disposed below the stack 300 and may be configured to provide a hydrogen-containing fuel feed to the stack 300, and may receive an anode fuel exhaust from the stack 300. The fuel plenum 304 may be connected to fuel inlet and outlet conduits 308 which are located below the fuel plenum 304.

Each interconnect 400 electrically connects adjacent fuel cells 310 in the stack 300. In particular, an interconnect 400 may electrically connect the anode electrode of one fuel cell 310 to the cathode electrode of an adjacent fuel cell 310. As shown in FIG. 3C, each interconnect 400 may be configured to channel air in a first direction A, such that the air may be provided to the cathode of an adjacent fuel cell 310. Each interconnect 400 may also be configured to channel fuel in a second direction F, such that the fuel may be provided to the anode of an adjacent fuel cell 310. Directions A and F may be perpendicular, or substantially perpendicular. As such, the interconnects 400 may be referred to as cross-flow interconnects.

The interconnect 400 may include fuel holes that extend through the interconnect 400 and are configured for fuel distribution. For example, the fuel holes may include one or more fuel inlets 402 and one or more fuel outlets 404, which may also be referred to as anode exhaust outlets 404. The fuel inlets and outlets 402, 404 may be disposed outside of the perimeter of the fuel cells 310. As such, the fuel cells 310 may be formed without corresponding through holes for fuel flow. The combined length of the fuel inlets 402 and/or the combined length of the fuel outlets 404 may be at least 75% of a corresponding length of the interconnect 400 e.g., a length taken in direction A.

In one embodiment, each interconnect 400 contains two fuel inlets 402 separated by a neck portion 412 of the interconnect 400, as shown in FIG. 3B. However, more than two fuel inlets 402 may be included, such as three to five inlets separated by two to four neck portions 412. In one embodiment, each interconnect 400 contains two fuel outlets 404 separated by a neck portion 414 of the interconnect 400, as shown in FIG. 3B. However, more than two fuel outlets 404 may be included, such as three to five outlets separated by two to four neck portions 414.

The fuel inlets 402 of adjacent interconnects 400 may be aligned in the stack 300 to form one or more fuel inlet risers 403. The fuel outlets 404 of adjacent interconnects 400 may be aligned in the stack 300 to form one or more fuel outlet risers 405. The fuel inlet riser 403 may be configured to distribute fuel received from the fuel plenum 304 to the fuel cells 310. The fuel outlet riser 405 may be configured to provide anode exhaust received from the fuel cells 310 to the fuel plenum 304.

Unlike the flat related art side baffles 38 of FIG. 1A, the side baffles 302 may be curved around edges of the interconnects 400. In particular, the side baffles 302 may be disposed around the fuel inlets 402 and outlets 404 of the interconnects 400. Accordingly, the side baffles may more efficiently control air flow through air channels of the interconnects 400, which are exposed between the side baffles 302 and are described in detail with regard to FIGS. 4A and 4B.

In various embodiments, the stack 300 may include at least 30, at least 40, at least 50, or at least 60 fuel cells, which may be provided with fuel using only the fuel risers 403, 405. In other words, as compared to a conventional fuel cell system, the cross-flow configuration allows for a large number of fuel cells to be provided with fuel, without the need for ASP's or external stack fuel manifolds, such as external conduits 32, 34 shown in FIG. 1A.

Each interconnect 400 may be made of or may contain electrically conductive material, such as a metal alloy (e.g., chromium-iron alloy) which has a similar coefficient of thermal expansion to that of the solid oxide electrolyte in the cells (e.g., a difference of 0-10%). For example, the interconnects 400 may comprise a metal (e.g., a chromium-iron alloy, such as 4-6 weight percent iron, optionally 1 or less weight percent yttrium and balance chromium alloy), and may electrically connect the anode or fuel-side of one fuel cell 310 to the cathode or air-side of an adjacent fuel cell 310. An electrically conductive contact layer, such as a nickel contact layer (e.g., a nickel mesh), may be provided between anode and each interconnect 400. Another optional electrically conductive contact layer may be provided between the cathode electrodes and each interconnect 400.

A surface of an interconnect 400 that in operation is exposed to an oxidizing environment (e.g., air), such as the cathode-facing side of the interconnect 400, may be coated with a protective coating layer in order to decrease the growth rate of a chromium oxide surface layer on the interconnect and to suppress evaporation of chromium vapor species which can poison the fuel cell cathode. Typically, the coating layer, which can comprise a perovskite such as lanthanum strontium manganite (LSM), may be formed using a spray coating or dip coating process. Alternatively, other metal oxide coatings, such as a spinel, such as an (Mn, Co)$_3$O$_4$ spinel (MCO), can be used instead of or in addition to LSM. Any spinel having the composition Mn$_{2-x}$Co$_{1+x}$O$_4$ (0≤x≤1) or written as z(Mn$_3$O$_4$)+(1−z)(Co$_3$O$_4$), where (⅓≤z≤⅔) or written as (Mn, Co)$_3$O$_4$ may be used. In other embodiments, a mixed layer of LSM and MCO, or a stack of LSM and MCO layers may be used as the coating layer.

Figures 4A, 4B:
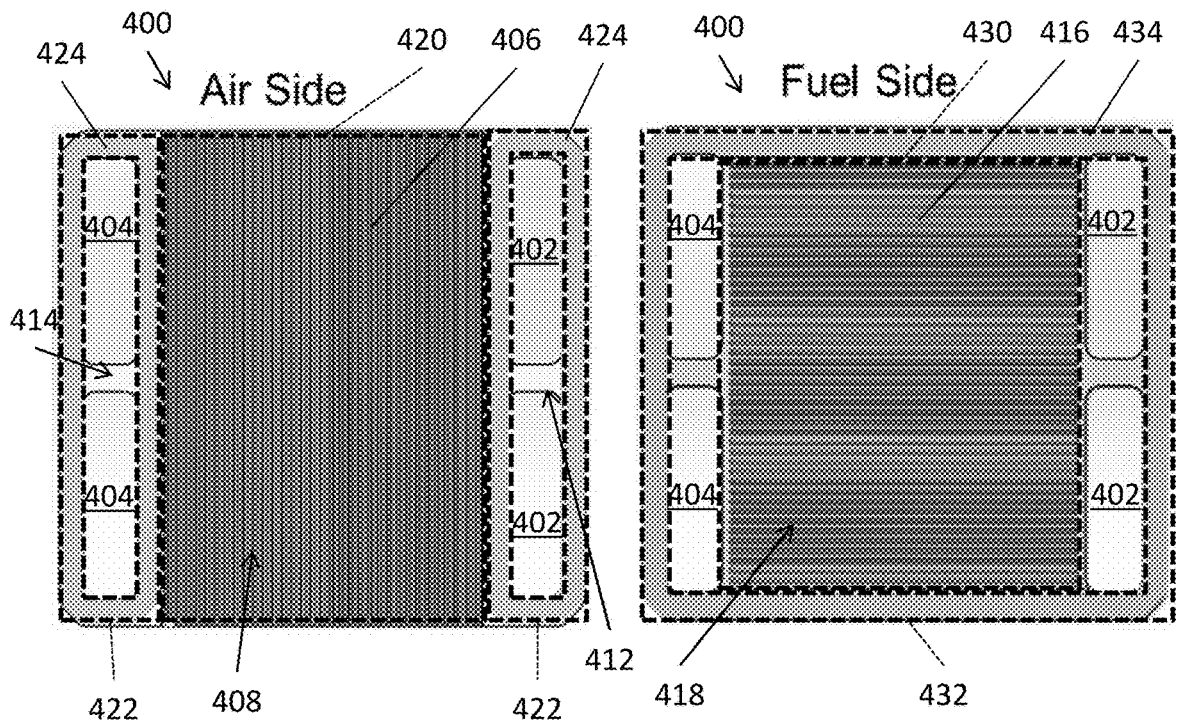
FIGS. 4A and 4B are plan views showing, respectively, an air side and a fuel side of the cross-flow interconnect of FIG. 3C, according to various embodiments of the present disclosure.

FIGS. 4A and 4B are plan views showing, respectively, an air side and a fuel side of the cross-flow interconnect 400, according to various embodiments of the present disclosure. Referring to FIG. 4A, the air side of the interconnect 400 may include ribs 406 configured to at least partially define air channels 408 configured to provide air to the cathode of a fuel cell 310 disposed thereon. The air side of the interconnect 400 may be divided into an air flow field 420 including the air channels 408, and riser seal surfaces 422 disposed on two opposing sides of the air flow field 420. One of the riser seal surfaces 422 may surround the fuel inlets 402 and the other riser seal surface 422 may surround the fuel outlets 404. The air channels 408 and ribs 406 may extend completely across the air side of the interconnect 400, such that the air channels 408 and ribs 406 terminate at opposing peripheral edges of the interconnect 400. In other words, when assembled into a stack 300, opposing ends of the air channels 408 and ribs 406 are disposed on opposing (e.g., front and back) outer surfaces of the stack, to allow the blown air to flow through the stack. Therefore, the stack may be externally manifolded for air.

Riser seals 424 may be disposed on the riser seal surface 422. For example, one riser seal 424 may surround the fuel inlets 402, and one riser seal 424 may surround the fuel outlets 404. The riser seals 424 may prevent fuel and/or anode exhaust from entering the air flow field 420 and contacting the cathode of the fuel cell 310. The riser seals 424 may also operate to prevent fuel from leaking out of the fuel cell stack 100 (see FIG. 3A).

Referring to FIG. 4B, the fuel side of the interconnect 400 may include ribs 416 that at least partially define fuel channels 418 configured to provide fuel to the anode of a fuel cell 310 disposed thereon. The fuel side of the interconnect 400 may be divided into a fuel flow field 430 including the fuel channels 418, and an perimeter seal surface 432 surrounding the fuel flow field 430 and the fuel inlets and outlets 402, 404. The ribs 416 and fuel channels 418 may extend in a direction that is perpendicular or substantially perpendicular to the direction in which the air-side channels 408 and ribs 406 extend.

A frame-shaped perimeter seal 434 may be disposed on the perimeter seal surface 432. The perimeter seal 434 may be configured to prevent air entering the fuel flow field 430 and contacting the anode on an adjacent fuel cell 310. The perimeter seal 434 may also operate to prevent fuel from exiting the fuel risers 403, 405 and leaking out of the fuel cell stack 300 (see FIGS. 3A and 3B).

The seals 424, 434 may comprise a glass or ceramic seal material. The seal material may have a low electrical conductivity. In some embodiments, the seals 424, 434 may be formed by printing one or more layers of seal material on the interconnect 400, followed by sintering.

In some embodiments, the seals 424, 434 may be formed of a silicate glass seal material comprising SiO$_2$, BaO, CaO, Al$_2$O$_3$, K$_2$O, and/or B$_2$O$_3$. For example, the seal material may include, by weight: SiO$_2$ in an amount ranging from about 40% to about 60%, such as from about 45% to about 55%; BaO in an amount ranging from about 10% to about 35%, such as from about 15% to about 30%; CaO in an amount ranging from about 5% to about 20%, such as from about 7% to about 16%; $Al_2O_3$ in an amount ranging from about 10% to about 20%, such as from about 13% to about 15%; and $B_2O_3$ in an amount ranging from about 0.25% to about 7%, such as from about 0.5% to about 5.5%. In some embodiments, the seal material may additionally include $K_2O$ in an amount ranging from about 0.5% to about 1.5%, such as from about 0.75% to about 1.25%.

In some embodiments, the seals 424, 434 may be formed of a silicate glass seal material comprising $SiO_2$, $B_2O_3$, $Al_2O_3$, CaO, MgO, $La_2O_3$, BaO, and/or SrO. For example, the seal material may include, by weight: $SiO_2$ in an amount ranging from about 30% to about 60%, such as from about 35% to about 55%; $B_2O_3$ in an amount ranging from about 0.5% to about 15%, such as from about 1% to about 12%; $Al_2O_3$ in an amount ranging from about 0.5% to about 5%, such as from about 1% to about 4%; CaO in an amount ranging from about 2% to about 30%, such as from about 5% to about 25%; MgO in an amount ranging from about 2% to about 25%, such as from about 5% to about 20%; and $La_2O_3$ in an amount ranging from about 2% to about 12%, such as from about 5% to about 10%. In some embodiments, the seal material may additionally include BaO in an amount ranging from about 0% to about 35%, such as from about 0% to about 30%, or from about 0.5% to about 30%, including about 20% to about 30%, and/or SrO in an amount ranging from about 0% to about 20%, such as from about 0% to about 15%, of from about 0.5% to about 15%, including about 10% to about 15%. In some embodiments, the seal material may additionally include at least one of BaO and/or SrO in a non-zero amount such as at least 0.5 wt. %, such as both of BaO and SrO in a non-zero amount, such at least 0.5 wt. %.

Figures 5A, 5B:
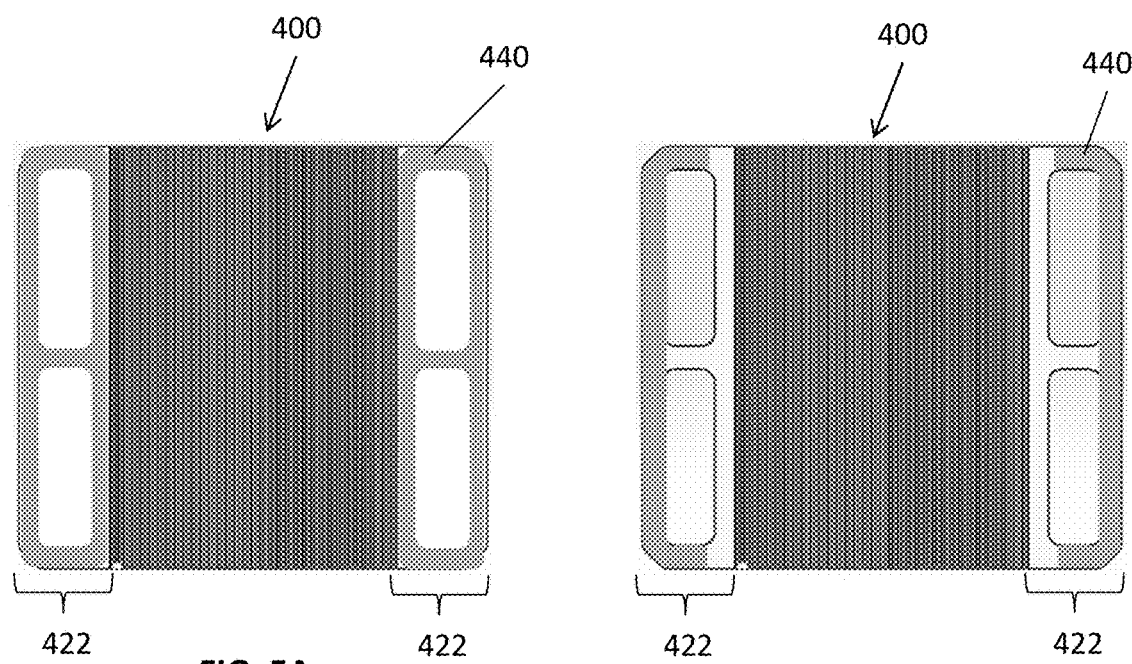
FIG. 5A is a plan view showing the air side of the interconnect of FIG. 3C.
FIG. 5B is a plan view showing a modified version of the interconnect of FIG. 5A.

FIG. 5A is a plan view showing the air side of the interconnect 400 without the riser seals 424, according to various embodiments of the present disclosure, and FIG. 5B is a plan views showing a modified version of the interconnect 400 of FIG. 5A.

In conventional counter flow fuel cell system designs, the fuel cell electrolytes fully cover the interconnects, such that the fuel cell electrolytes operate as dielectric layers between adjacent interconnects. In a crossflow design, interconnects may extends past the perimeter of the fuel cells. This can potentially result in electrical shorting between interconnects, if the stack is tilted, or if seals become conductive over time.

Referring to FIGS. 5A and 5B, the interconnect 400 may include dielectric layers 440 disposed on the riser seal surfaces 422. For example, as shown in FIG. 5A, each dielectric layer 440 may be annular and may cover all, or substantially all, of the corresponding riser seal surface 422. For example, in the embodiment of FIG. 5A, the dielectric layers 440 may be D-shaped and may have substantially the same shape as the riser seals 424 shown in FIG. 4A disposed thereon. In other embodiments, as shown in FIG. 5B, the dielectric layers 440 may be C-shaped and may cover only a portion of the corresponding riser seal surface 422, such as a portion adjacent to the outer perimeter of the interconnect 400. The dielectric layers 440 form an electrically insulating barrier between adjacent interconnects 400 and prevent electrical shorting if a corresponding stack is tilted or if a seal becomes conductive.

The dielectric layers 440 may comprise alumina, zircon (zirconium silicate), silicon carbide, crystalline glass (e.g., quartz or a glass-ceramic), or other high temperature dielectric materials. In some embodiments, the dielectric layers 440 may include a corrosion barrier material or layer. For example, the dielectric layers 440 may comprise a composite material comprising a corrosion-tolerant glass, alumina, zircon, or the like. For example, in some embodiments the dielectric layers 440 comprise a glass ceramic layer formed from a substantially glass barrier precursor layer containing at least 90 wt. % glass (e.g., 90-100 wt. % glass, such as around 99 to 100 wt. % amorphous glass and 0 to 1 wt. % crystalline phase) applied to a surface of interconnect 400 in the SOFC stack 300. In one embodiment, the glass barrier precursor layer containing at least 90 wt. % glass comprises: 45-55 wt. % silica ($SiO_2$); 5-10 wt. % potassium oxide ($K_2O$); 2-5 wt. % calcium oxide (CaO); 2-5 wt. % barium oxide (BaO); 0-1 wt. % boron trioxide ($B_2O_3$); 15-25 wt. % alumina ($Al_2O_3$); and 20-30 wt. % zirconia ($ZrO_2$) on an oxide weight basis.

In some embodiments, the glass barrier precursor layer comprises least 90% glass (e.g., 90-100 wt. % glass, such as around 99 to 100 wt. % amorphous glass and 0 to 1 wt. % crystalline phase) by weight. For example, the glass barrier precursor layer may comprise, on an oxide weight basis: from about 30% to about 60%, such as from about 35% to about 55%, silica ($SiO_2$); from about 0.5% to about 15%, such as from about 1% to about 12%, boron trioxide ($B_2O_3$); from about 0.5% to about 5%, such as from about 1% to about 4%, alumina ($Al_2O_3$); from about 2% to about 30%, such as from about 5% to about 25%, calcium oxide (CaO); from about 2% to about 25%, such as from about 5% to about 20% magnesium oxide (MgO); from about 0% to about 35%, such as from about 20% to about 30%, barium oxide (BaO); from about 0% to about 20%, such as from about 10% to about 15%, strontium oxide (SrO); and from about 2% to about 12%, such as from about 5% to about 10%, lanthanum oxide ($La_2O_3$). In some embodiments, the glass barrier precursor material may include at least one of BaO and/or SrO in a non-zero amount such as at least 0.5 wt. %, such as both of BaO and SrO in a non-zero amount, such at least 0.5 wt. %.

In some embodiments, some or all of a LSM/MCO coating may be removed on the air side of the interconnect 400 in the area around the riser seal 424, to prevent Mn diffusion from the LSM/MCO material into the riser seal 424, and thereby prevent the riser seal 424 from becoming conductive. In other embodiments, the riser seals 424 may be formed of crystalline glass or glass-ceramic materials that do not react with the LSM/MCO coating, such as the borosilicate glass-ceramic compositions discussed above.

The dielectric layer 440 can be formed from freestanding layers, such as a tape cast and sintered layer, and may be disposed between interconnects 400 during fuel cell stack assembly. In other embodiments, the dielectric layers 440 may be formed by dispersing a dielectric material in an ink, paste, or slurry form, and subsequently screen printed, pad printed, aerosol sprayed onto the interconnect 400. In some embodiments, the dielectric layer 440 may be formed by a thermal spraying process, such as an atmospheric plasma spray (APS) process. For example, the dielectric layer 440 may include alumina deposited by the APS process.

The dielectric layer 440 may be deposited directly on the interconnect 400. For example, the dielectric layer 440 may be disposed directly on the riser seal surfaces 422 (i.e., parts of the interconnect 400 around the fuel inlets and outlets 402, 404 in areas that will be covered by the riser seals 424 and that are not covered by the LSM/MCO coating, except for a small area of overlap (e.g., seam) where the dielectric layer 440 overlaps with a LSM/MCO coating where the riser seal surface 422 meets the air flow field 420, so as to prevent Cr evaporation from an exposed surface of the interconnect 400. Thus, the LSM/MCO coating is located on the interconnect 400 surface in the air flow field 420 containing air channels 408 and ribs 406, but not in the riser seal surface 422 of the interconnect 400 surrounding the fuel inlets and outlets 402, 404. The dielectric layer 440 is located on the riser seal surface of the interconnect 400 in the area surrounding the fuel inlets and outlets 402, 404 that is not covered by the LSM/MCO coating and on the edge of the LSM/MCO coating in the air flow field 420 adjacent to the riser seal surface 422. Alternatively, the dielectric layer 440 may be omitted and there is no dielectric layer 440 deposited around the fuel riser openings.

The fuel cell stack and/or components thereof may be conditioned and/or sintered. "Sintering" includes processes for heating, melting and/or reflowing a glass or glass-ceramic seal precursor materials to form seals in a fuel cell stack, which may be performed at elevated temperature (e.g., 600-1000° C.) in air and/or inert gas. "Conditioning" includes processes for reducing a metal oxide (e.g., nickel oxide) in an anode electrode to a metal (e.g., nickel) in a cermet electrode (e.g., nickel and a ceramic material, such as a stabilized zirconia or doped ceria) and/or heating the stack 300 during performance characterization/testing, and may be performed at elevated temperature (e.g., 750-900° C.) while fuel flows through the stack. The sintering and conditioning of the fuel cell stack 300 may be performed during the same thermal cycle (i.e., without cooling the stack to room temperature between sintering and conditioning).

Figure 6A:
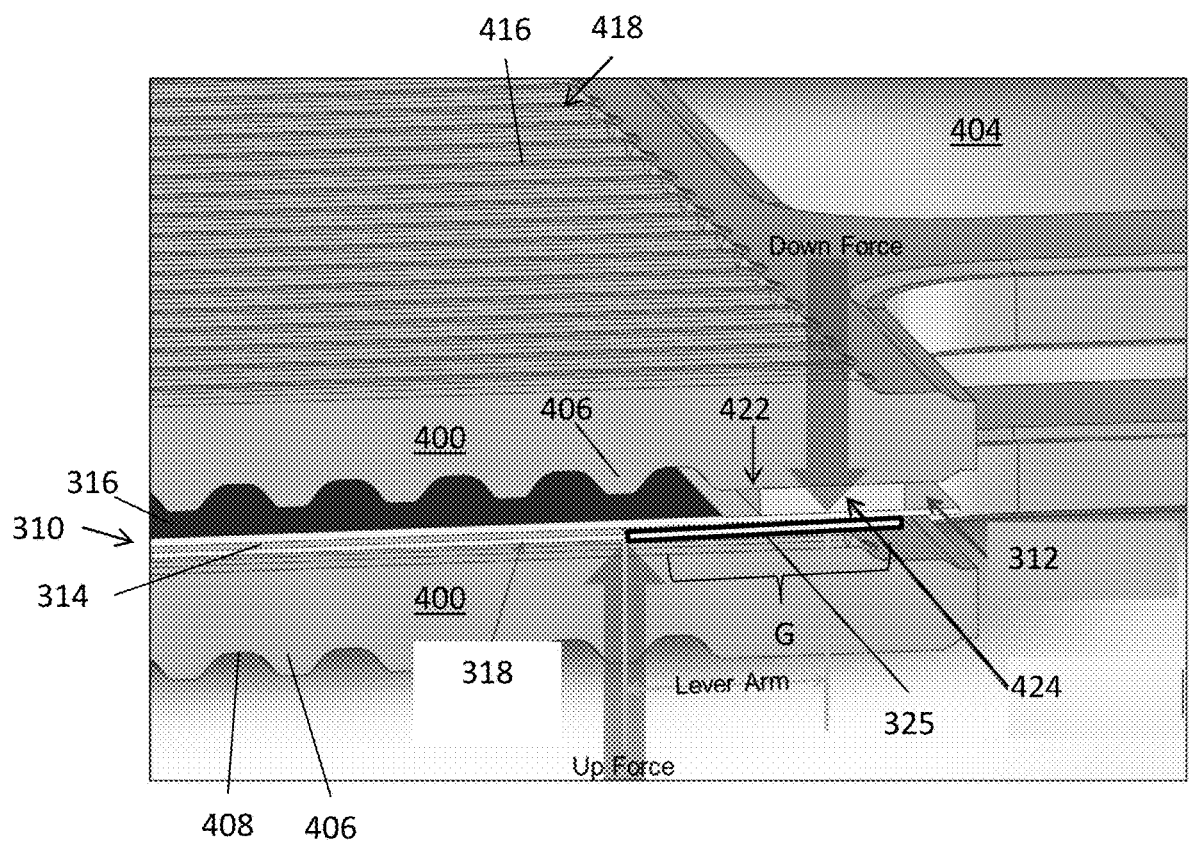
FIG. 6A is a sectional perspective view of two interconnects of FIGS. 4A and 4B, and a fuel cell as assembled in the fuel cell stack of FIG. 3A, according to various embodiments of the present disclosure.
Figure 6B:
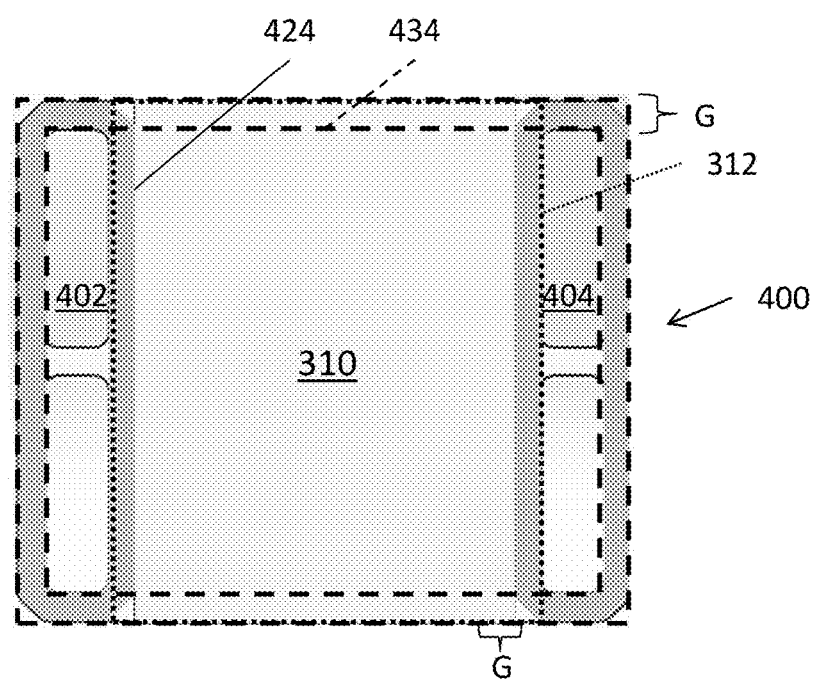
FIG. 6B is a top view showing the overlap of the fuel cell and seals on the fuel side of an interconnect of FIG. 6A.

FIG. 6A is a sectional perspective view of two interconnects 400 of FIGS. 4A and 4B, and a fuel cell 310 as assembled in the fuel cell stack 300 of FIG. 3A, according to various embodiments of the present disclosure. FIG. 6B is a top view showing the overlap of the fuel cell 310, and seals 424, 434, on the fuel side of an interconnect 400 of FIG. 6A.

Referring to FIGS. 4A, 4B, 6A, and 6B, when assembled in a fuel cell stack, the fuel cell 310 is disposed between the interconnects 400, so as to face the air flow field 420 and the fuel flow field 430 of each interconnect 400. The riser seals 424 may contact first opposing sides of the air side of the fuel cell 310, and the perimeter seal 434 may contact second opposing sides of the fuel side of the fuel cell 310. Portions of the perimeter seal 434 adjacent the fuel inlets and outlets 402, 404 may overlap with corresponding portions of the riser seals 424. In addition, portions of the fuel cell 310 may be disposed between overlapping portions of the seals 424, 434, such as at corners of the fuel cell 310. As such, a combined thickness of the overlapped portions of the fuel cell 310 and seals 424, 434 may be greater than a thickness of the overlapped portions of the seals 424, 434.

Accordingly, stress may be applied to the corners of the fuel cells 310, during assembly and/or during sintering, which may result in damage to the fuel cells 310, such as cracked corners. Therefore, various embodiments of the present disclosure provide methods and stack configurations that are configured to protect the fuel cells 310 from damage during assembly and/or sintering processes.

In addition, since the seals 424, 434 overlap the corners of the fuel cell 310, gaps G may be formed along the perimeter of the fuel cell 310 and between the corners of the fuel cells 310, below each of the riser seals 424 (e.g., below the electrolyte 312) and above the perimeter seal 434. When the stack 300 is compressed, a down force may be transmitted through the interconnects 400 and seals 424, 430, and into the unsupported edges of the fuel cell 310 adjacent the gaps G, which may create a lever arm effect, due to the adjacent gaps G.

According to various embodiments of the present disclosure, in order to support the edges of the electrolyte 312, the conductive layer 318 (e.g., nickel mesh) may be extended into the gaps G. In some embodiments, the anode 314 and/or cathode 316 may also be extended to cover the electrolyte below the riser seals 424, in combination with extending the conductive layer 318 into the gaps G. In other embodiments, one or more electrolyte reinforcement layers 325 may be formed on one or both sides of the electrolyte 312 below the riser seals 424, and may be formed of a ceramic material, such as alumina and/or zirconia. The electrolyte reinforcement layer 325 may have substantially the same thickness as the anode 314 and/or cathode 316, and may further support the edge of the fuel cell 310 in conjunction with the conductive layer 318. In some embodiments, the electrolyte reinforcement layer 325 may be disposed on the cathode-side of the fuel cell 310 and may be formed of a chromium getter material, such as manganese cobalt oxide spinel. As such, the electrolyte reinforcement layer 325 may be configured to remove chromium from air supplied to the fuel cell 310.

Stress Reduction Seals

In the first and second embodiments of the present disclosure, riser seals and/or perimeter seals may be stress reduction seals configured to reduce the compressive stress applied to fuel cells in a fuel cell stack. In the first and second embodiments, the stress reduction seals may include support portions or extensions configured to reduce an amount of compressive stress applied to portions of the fuel cells, such as corners of the fuel cells, as discussed below with respect to FIGS. 7A-8B.

Figure 7A:
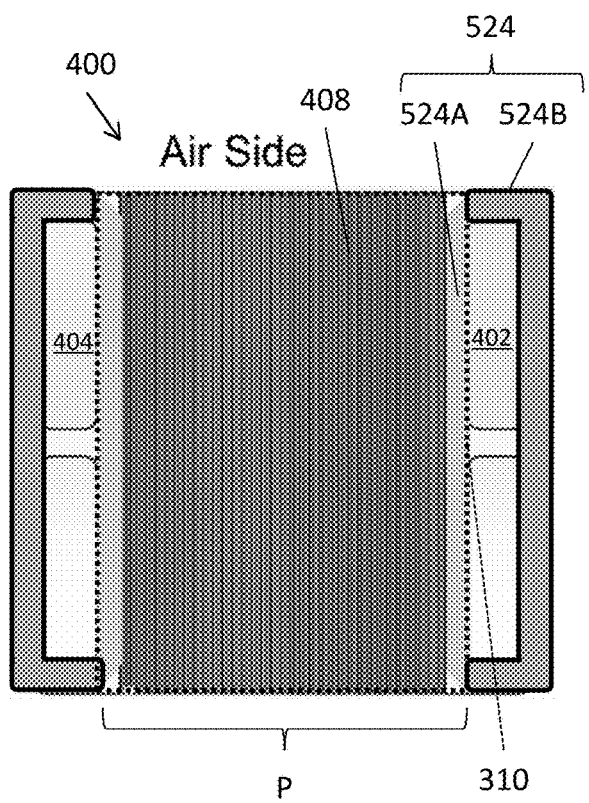
FIG. 7A is a top view showing stress reduction riser seals disposed on the air side of an interconnect.
Figure 7B:
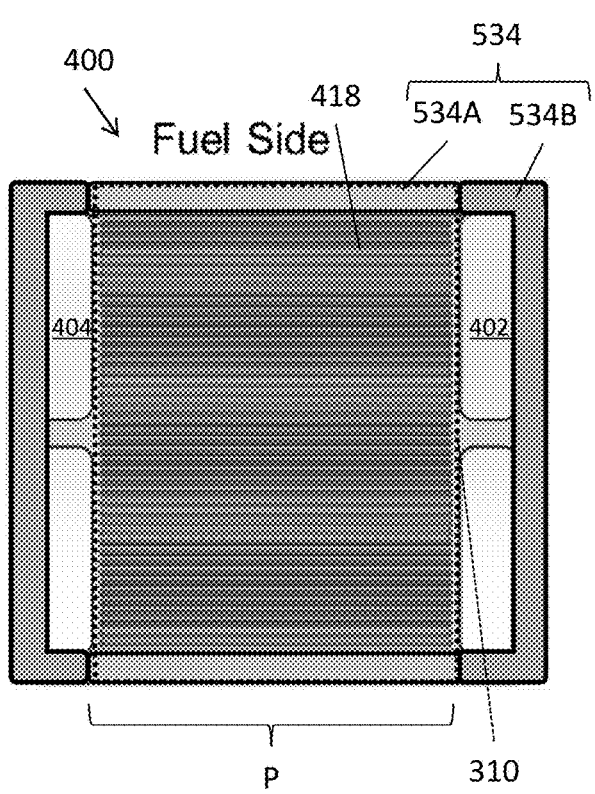
FIG. 7B is a top view showing a stress reduction perimeter seal disposed on the fuel side of an interconnect, according to a first embodiment of the present disclosure.

FIG. 7A is a top view showing stress reduction riser seals 524 disposed on the air side of an interconnect 400, and FIG. 7B is a top view showing a stress reduction perimeter seal 534 disposed on the fuel side of an interconnect 400, according to a first embodiment of the present disclosure.

Referring to FIG. 7A, the riser seals 524 may surround the fuel inlets 402 and outlets 404 of the interconnect 400, as discussed above with regard to the riser seals 424 shown in FIG. 4A. However, the riser seals 524 may each include a relatively thin base portion 524A disposed adjacent to the air channels 408 (e.g., between the air channels 408 and the fuel inlets 402 and outlets 404) and a relatively thick support portion 524B disposed on the perimeter of the interconnect 400. The base portions 524A may be configured to contact a fuel cell 310 disposed on the interconnect 400, and the support portions 524B may be configured to contact an adjacent interconnect 400 in a fuel cell stack. In other words, the base portions 524A may be disposed inside of a perimeter of the fuel cell 310 (e.g., facing the fuel cell 310), and the support portions 524B may be disposed outside of the perimeter of the fuel cell 310. As such, the support portions 524B of the riser seals 524 may at least partially define a pocket region P for receiving the fuel cell 310 on the base portions 524A of the riser seals 524.

In this embodiment, the riser seals 524 comprise the support portions 524B having a first thickness and base portions 524A having a second thickness that is less than the first thickness, and the support portions 524B at least partially define the pocket region P. A first side (e.g., cathode side) of a first fuel cell 310 is disposed on the base portions 524A in the pocket region P, such that the first fuel cell 310 is partially surrounded by the support portions 524B and opposing edges of the first fuel cell 310 contact the base portions 524. Thus, the base portions 524A may have a reduced thickness to accommodate seating of the fuel cell 310. For example, the base portions 524A may have a thickness ranging from about 25 to about 400 microns, such as from about 50 to about 350 microns, from about 100 to about 300 microns, or about 200 microns. The support portions 524B may have a greater thickness than that of the base portions 524A to reduce pressure applied to the fuel cell 310 from adjacent interconnects 400. For example, the support portions 524B may have a thickness ranging from about 150 to about 850 microns, such as from about 150 to about 750 microns, from about 200 to about 700 microns, from about 350 to about 550 microns, or about 450 microns.

The riser seals 524 may be formed by printing or dispensing a seal material onto the interconnect 400. For example, the riser seals 524 may be formed by a dual emulsion screen printing process, wherein a seal material may be applied to a single screen at different thicknesses. In this process, both the base portions 524A and the support portions 524B contains a glass or glass ceramic seal material in addition to other seal material (e.g., seal ink) components, such as a binder, a plasticizer and a solvent. As such, the riser seals 524 may be formed by a single print processes. In other embodiments, the riser seals 524 may be formed by applying different amounts of the seal material to different portions of the interconnect 400, by applying multiple layers of the seal material using two different screen printing processes with different respective screens, or by shaping an applied layer of seal material.

In various embodiments, the riser seals 524 may be dried or cured prior to receiving a fuel cell and/or being assembled into a fuel cell stack.

Referring to FIG. 7B, the perimeter seal 534 may cover the perimeter of the interconnect 400, as discussed above with regard to the perimeter seal 434 shown in FIG. 4B. However, the perimeter seal 534 may include relatively thin base portions 534A disposed adjacent to the fuel channels 418 and relatively thick support portions 534B disposed on the perimeter of the interconnect 400, outside of the fuel inlets 402 and fuel outlets 404. The base portions 534A may be configured to contact a fuel cell 310 disposed on the interconnect 400, and the support portions 534B may be configured to contact an adjacent interconnect 400 in a fuel cell stack. In other words, the base portions 534A may be disposed inside of a perimeter of the fuel cell 310 (e.g., facing the fuel cell 310), and the support portions 534B may be disposed outside of the perimeter of the fuel cell 310. As such, the support portions 534B of the perimeter seal 534 may at least partially define a pocket region P for receiving the fuel cell 310 on the base portions 534A of the perimeter seal 534.

In this aspect of the first embodiment, the perimeter seal 534 comprises the support portion 534B having a first thickness and base portion 534A having a second thickness that is less than the first thickness and the support portion 534B at least partially defines a pocket region. A second side (e.g., anode side) of a second fuel cell 310 is disposed on the base portion 534A in the pocket region P, such that the second fuel cell 310 is partially surrounded by the support portion 534B and opposing edges of the second fuel cell 310 contact (e.g., are located on) the base portion 534A. Thus, the base portions 534A may have a reduced thickness to accommodate seating of the fuel cell 310. For example, the base portions 534A may have a thickness ranging from about 25 to about 400 microns, such as from about 50 to about 350 microns, from about 100 to about 300 microns, or about 200 microns. The support portions 534B may have a greater thickness than that of the base portions 534A to reduce pressure applied to the fuel cell 310 from adjacent interconnects 400. For example, the support portions 534B may have a thickness ranging from about 150 to about 850 microns, such as from about 150 to about 750 microns, from about 200 to about 700 microns, from about 350 to about 550 microns, or about 450 microns.

The perimeter seal 534 may be formed by printing or dispensing a seal material onto the interconnect 400. For example, the perimeter seals 534 may be formed by a dual emulsion screen printing process, wherein a seal material may be applied to a single screen at different thicknesses. In this process, both the base portions 534A and the support portions 534B contains a glass or glass ceramic seal material in addition to other seal material (e.g., seal ink) components, such as a binder, a plasticizer and a solvent. As such, the perimeter seals 534 may be formed by a single print processes. In other embodiments, the perimeter seals 534 may be formed by applying different amounts of the seal material to different portions of the interconnect 400, by applying multiple layers of the seal material using two different screen printing processes with different respective screens, or by shaping an applied layer of seal material.

In various embodiments, the perimeter seal 534 may be dried or cured prior to receiving a fuel cell and/or being assembled into a fuel cell stack.

In some embodiments the seals 524, 534 of FIGS. 7A and 7B may both be applied to the same interconnect 400. In other embodiments, the riser seals 524 of FIG. 7A and the perimeter seal 434 of FIG. 4B may be applied to the opposite sides of the same interconnect 400, or the perimeter seal 534 of FIG. 7B and the riser seals 424 of FIG. 4A may be applied to the opposite sides of the same interconnect 400.

The interconnects 400 may be fitted with fuel cells 310 and assembled into a fuel cell stack, such that the support portions 524B. 534B bear a compressive force applied to the interconnects 400 and reduce an amount of pressure applied to the fuel cells 310. As such, damage to the fuel cells 310 may be reduced and/or prevented. The stack may then be sintered by heating the stack to a softening temperature of the seals 524, 534, such that the seals 524, 534 reflow and seal the fuel cell stack.

In another embodiment, the seals 524, 534 may each be formed by depositing a layer of seal material on the interconnect 400 to form the base portions 524A, 534A and a bottom layer of the support portions 524B, 534B. A sacrificial support material may then be deposited on the seal material layer to increase the thickness of the support portions 524B, 534B. In particular, the support material may include a plasticizer and a binder configured to burn out at a temperature sufficient to cause softening of the seal material. Thus, in this embodiment, the top layer (i.e., region) of the support portions 524B, 534B contains only the plasticizer and a binder, and does not contain the glass or glass ceramic seal material. In contrast, the bottom layer (i.e., region) of the support portions 524B, 534B contains the glass or glass ceramic seal material in addition to the plasticizer and the binder. The plasticizer and binder are burned out from both top and bottom layers of the support portions 524B. 534B which leaves the glass or glass ceramic seal material in the bottom layer and completely removes the top layer during burn out and/or sintering steps.

The seals 524, 534 may be dried or cured and assembled into a fuel cell stack, such that the support portions 524B, 534B support the interconnects 400 and reduce an amount of pressure applied to the fuel cells 310. The stack may be sintered, such that the support material is burned out and the seals 524, 534 reflow and seal the fuel cell stack.

Figure 8A:
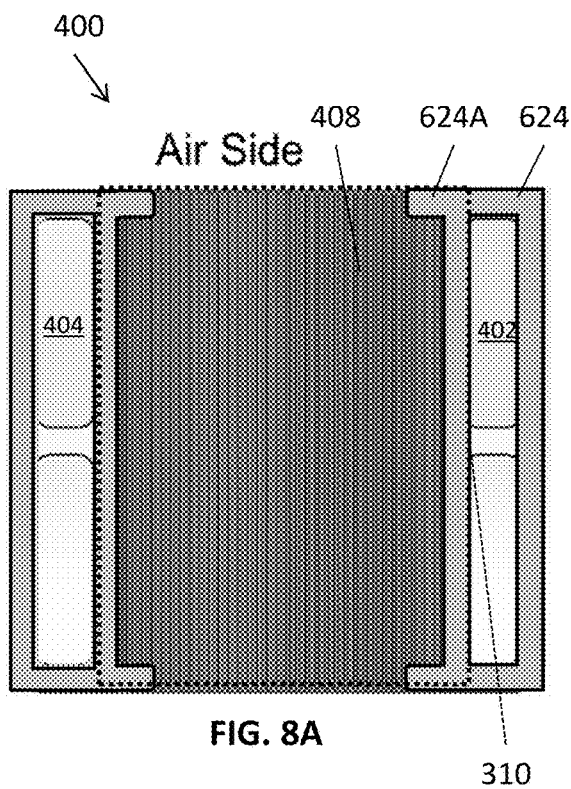
FIG. 8A is a top view showing stress reduction riser seals disposed on the air side of an interconnect.

FIG. 8A is a top view showing stress reduction riser seals 624 disposed on the air side of an interconnect 400, and FIG.

8B is a top view showing a stress reduction perimeter seal 634 disposed on the fuel side of an interconnect 400, according to a second embodiment of the present disclosure.

Referring to FIG. 8A, the riser seals 624 may surround the fuel inlets 402 and outlets 404 of the interconnect 400, as discussed above with regard to the riser seals 424, 524 shown in FIGS. 4A and 7A. However, the riser seals 624 may each include additional seal extensions 624A that extend perpendicular to the air channels 408 of the interconnect 400. The seal extensions 624A may provide additional support to a fuel cell 310 disposed on the air side of the interconnect 400. Accordingly, the seal extensions 624A may be configured to decrease stress applied to the fuel cell 310, by spreading a force applied to the fuel cell 310 over a larger area. In particular, the seal extensions 624A may reduce an amount of force applied to the corners of the fuel cell 310, when the fuel cell is compressed in a fuel cell stack.

Figure 8B:
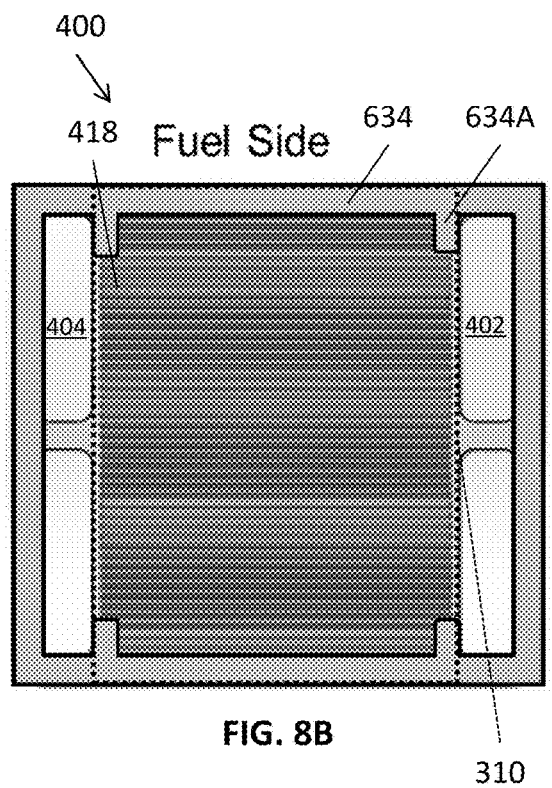
FIG. 8B is a top view showing a stress reduction perimeter seal disposed on the fuel side of an interconnect, according to a second embodiment of the present disclosure.

Referring to FIG. 8B, the perimeter seal 634 may cover the perimeter of the interconnect 400, as discussed above with regard to the perimeter seal 434, 534, as shown in FIGS. 4B and 7B. However, the perimeter seal 634 may include additional seal extensions 634A that extend perpendicular to the fuel channels 418 of the interconnect 400. The seal extensions 634A may provide additional support to a fuel cell 310 disposed on the fuel side of the interconnect 400. Accordingly, the seal extensions 634A may be configured to decrease stress applied to the fuel cell 310, by spreading a force applied to the fuel cell 310 over a larger area. In particular, the seal extensions 634A may reduce an amount of force applied to the corners of the fuel cell 310, when the fuel cell is compressed in a fuel cell stack.

Referring to FIGS. 8A and 8B, the stress-reducing seals 624, 634 of FIGS. 8A and 8B may be applied to opposite sides of the same interconnect 400. In an alternative embodiment, one of the seals 624, 634 of FIGS. 8A and 8B may be applied to one side of the interconnect 400 and one of the other seals (e.g., 424, 434, 524, 534) disclosed herein may be applied to the opposite side of the same interconnect 400.

Methods of Assembling a Fuel Cell Stack

Third and fourth embodiments of the present disclosure provide various methods of assembling a fuel cell stack that reduce and/or prevent fuel cell damage. In particular, riser and perimeter seals may be formed on an interconnect, by depositing a liquid (e.g., emulsion or suspension) seal material, such as a seal material ink, containing a glass or glass ceramic seal material, a solvent, and at least one of a plasticizer or binder. For example, the seal material may be deposited using any suitable dispensing or printing processes, such as screen printing, inkjet printing, coating, or the like.

In the third embodiment described with respect to FIG. 9 below, the liquid (e.g., wet) seal material may be solidified (e.g., dried and/or cured) before a fuel cell is placed in contact with the liquid seal material (e.g., before the interconnect is assembled into a fuel cell stack). In a fourth embodiment described with respect to FIG. 10 below, the liquid (e.g., wet) seal material may be solidified (e.g., dried and/or cured) after a fuel cell is placed in contact with the liquid seal material (e.g., after the interconnect is assembled into a fuel cell stack).

In one embodiment, the liquid seal material is solidified by drying either at room temperature or at temperature that is above room temperature and below a glass reflow temperature of the seal material. For example, the seal material may be placed into a furnace maintained at a temperature above room temperature to evaporate the solvent and other liquid components of the seal material ink.

In another embodiment, the seal material is solidified by ultra-violet (UV) curing. In this embodiment, the seal material may be a UV-curable seal material that includes a UV-curable resin as a binder. Accordingly, the UV-curable seal material may be cured by the exposure of the seal material to UV radiation to solidify the seal material into a hardened, epoxy-like state. Accordingly, the UV-curable seal material may be solidified without a separate drying process or the UV-curable seal material may be both cured and dried.

Figure 9:
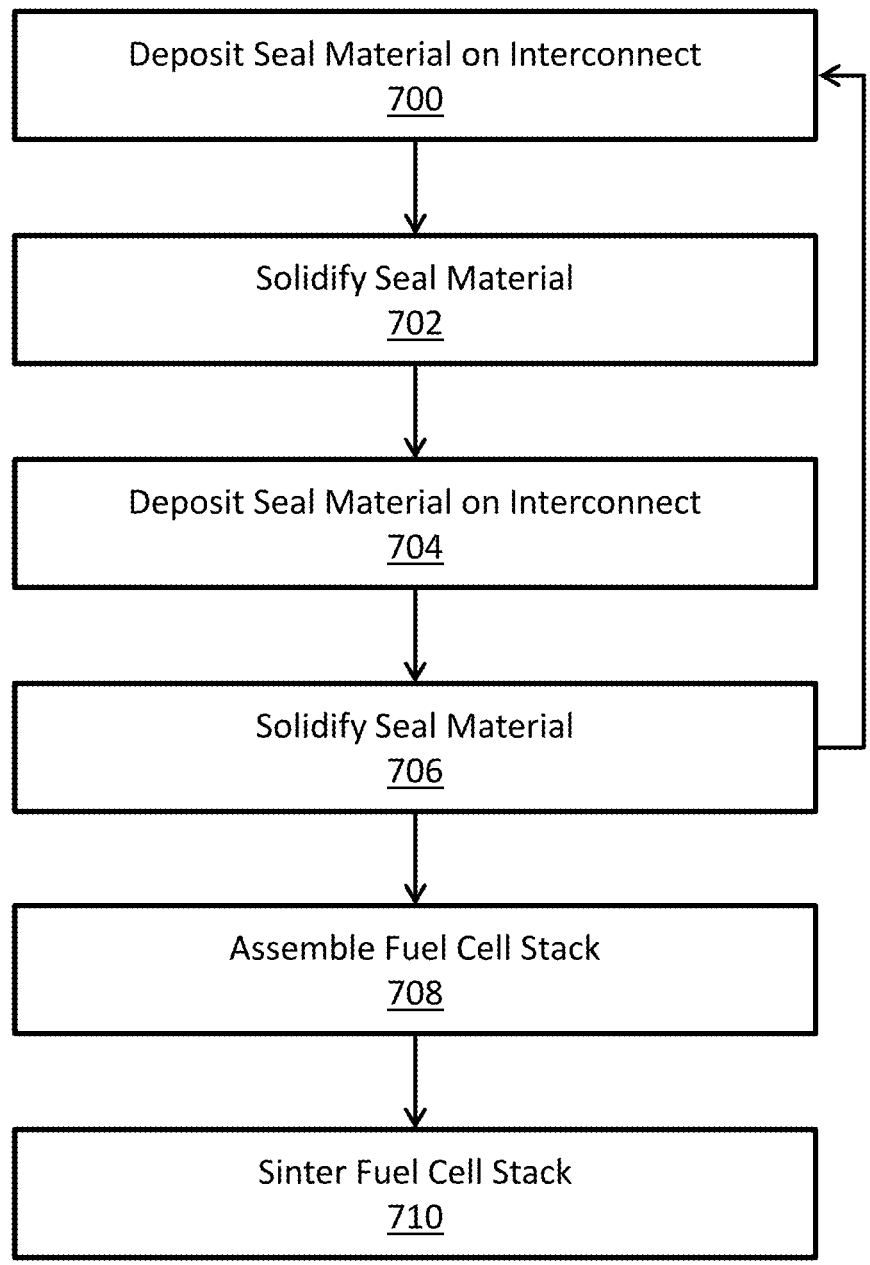
FIG. 9 is a flow diagram depicting a method of forming a fuel cell stack, according to a third embodiment of the present disclosure.

FIG. 9 is a flow diagram depicting a method of forming a fuel cell stack, according to the third embodiment of the present disclosure in which the liquid (e.g., wet) seal material may be solidified (e.g., dried and/or cured) before a fuel cell is placed in contact with the liquid seal material (e.g., before the interconnect is assembled into a fuel cell stack). Referring to FIG. 9, in step 700, the method may include depositing a seal material on a first side of an interconnect. For example, the seal material may be deposited on the air side of the interconnect 400 to form any of the riser seals 424, 524 or 624 described above, or may be deposited on the fuel side of the interconnect 400 to form any of the perimeter seals 434, 534 or 634 described above. In some embodiments, the seal material may be a UV-curable seal material, as described above.

In step 702, the liquid seal material may then be solidified by drying and/or curing. For example, the seal material may be dried by heating at a temperature below the glass reflow temperature of the seal material. Alternatively or additionally, the seal material may be cured by exposure to UV radiation, if the seal material is the UV-curable seal material.

In step 704, the seal material is deposited on a second side of the interconnect. For example, if riser seals 424, 524 or 624 are formed on the air side of the interconnect 400 in step 700, then the seal material may be deposited on the fuel side of the interconnect 400 to form the perimeter seal 434, 534 or 634. In particular, the perimeter seal may be formed by disposing a conductive layer (e.g., nickel mesh) 318 on the fuel side of the interconnect 400, and then printing or dispensing the seal material onto the interconnect 400 and the conductive layer 318 to form the perimeter seal 434, 534 or 634. Alternatively, if the perimeter seal is formed in step 700, then the seal material may be deposited on the air side of the interconnect to form the riser seals, in step 704.

In step 706, the liquid seal material on the second side of the interconnect may then be solidified by drying and/or curing. For example, the seal material may be dried by heating at a temperature below the glass reflow temperature of the seal material. Alternatively or additionally, the seal material may be cured by exposure to UV radiation, if the seal material is the UV-curable seal material.

In some embodiments, steps 700-706 may be repeated multiple times to form seals on a plurality of interconnects 400, as indicated by the arrow connecting steps 706 and 700.

In step 708, a fuel cell 310 may be disposed on the solidified seals on each interconnect 400, such that the fuel cells and interconnects are stacked on one another to form a fuel cell stack 300.

In various embodiments, at least one of the riser seals and perimeter seals is a stress reduction seal as described above with regard to the riser seals 524 and 624 of FIGS. 7A and 8A, and/or the perimeter seals 534 and 634 of FIGS. 7B and 8B. For example, step 700 may include forming the riser seals 524 having a pocket region P or the riser seals 624 having extensions 624A, and step 704 may include forming the perimeter seals 534 having a pocket region P or the perimeter seals 634 having extensions 634A. Accordingly, by utilizing stress-reduction seals, the fuel cells may be protected from damage due to compressive stress applied within the fuel cell stack. Alternatively, riser seals 424 and/or perimeter seals 434 of FIGS. 4A and 4B respectively, may be formed in steps 700 and 704.

In step 710, the fuel cell stack 300 may be sintered and/or conditioned. For example, the fuel cell stack 300 may be heated to a temperature above the glass transition temperature of the seal material, such that the seal material reflows around the fuel cells 310.

In reference to FIGS. 3A, 3B, and 7A-9, a method of assembling a fuel cell stack 300 according to the third embodiment comprises providing the above described cross-flow first interconnect 400, depositing a seal material on the air side of the first interconnect to form riser seals 524, 624 of the first or second embodiments that surround the fuel holes 402, 404, depositing the seal material on the fuel side of the first interconnect 400 to form a perimeter seal 534, 634 of the first or second embodiments that surrounds the fuel channels 418 and the fuel holes 402, 404, positioning a first side (e.g., cathode side) of a first fuel cell 310 on the air side of the first interconnect 400 in contact with the riser seals 524, 624, placing a cross-flow second interconnect 400 into the fuel cell stack facing a second side (e.g., anode side) of the first fuel cell 310, positioning a second side (e.g., anode side) of a second fuel cell 310 on the fuel side of the first interconnect 400 in contact with the perimeter seal 534, 634, placing a cross-flow third interconnect into the fuel cell stack facing a first side of the second fuel cell, and sintering the fuel cell stack 300 to reflow the riser seals and the perimeter seal. The riser seals, the perimeter seal, or both the riser seals and the perimeter seal comprise at least one of at least one support portion or extensions which are configured to reduce an amount of compressive stress on corners of at least one of the first or second fuel cells 310 in the fuel cell stack 300.

In the fourth embodiment of the present disclosure, the liquid (e.g., wet) seal material may be solidified (e.g., dried and/or cured) after the fuel cell 310 is placed in contact with the liquid seal material (e.g., after the interconnect is assembled into a fuel cell stack). In other words, the fuel cell 310 is placed in contact with the liquid seal material prior to solidifying the seal material.

The fuel cell 310 may be placed in contact with any of the liquid (e.g., wet) seal materials that form any of the riser seals 424, 524 or 624 described above. Alternatively or in addition, the fuel cell 310 may be placed in contact with any of the liquid (e.g., wet) seal materials that form any of the peripheral seals 434, 534 or 634 described above.

The fuel cell 310 is pressed into the liquid seal material (e.g., seal material ink), causing the liquid seal material to flow around the fuel cell 310 to form a pocket region which surrounds at least parts of the edges of the fuel cell 310, similar to a footprint. The liquid seal material may be a UV-curable ink containing a UV-curable binder, or a non-curable ink which lacks a UV curable binder.

In one embodiment a liquid UV-curable seal material may be deposited on the fuel side of the interconnect 400 to form the precursor for the perimeter seal 434, 534 or 634. In some embodiments, the conductive layer (e.g., nickel mesh) 318 may be disposed on the fuel side of the interconnect 400, and the UV-curable seal material may be screen printed onto the conductive layer 318 and the fuel side of the interconnect 400. A solid oxide fuel cell 310 may then be positioned the fuel side of the interconnect 400, such that portions of the fuel cell 310 contact the wet UV-curable seal material. The solid oxide fuel cell 310 may contain a ceramic electrolyte, such as doped ceria or stabilized zirconia, which is transparent to UV radiation. The fuel cell 310 and the interconnect 400 are then pressed against each other, such that the UV-curable seal material flows around the fuel cell 310 to form a pocket region. The wet UV-curable seal material is then solidified by curing with UV radiation.

In particular, the anode and cathode electrodes of the fuel cell 310 may only be located in active region of the fuel cell (e.g., where the fuel cell is exposed to fuel and air) on opposite sides of the electrolyte. Thus, the seal material may only contact the inactive region(s) of the electrolyte that are not covered with the anode and cathode electrodes. In this case, the UV radiation may be radiated through the inactive region(s) of the electrolyte onto the liquid seal material located under the fuel cell 310 to cure the liquid seal material portions which are located under the inactive region(s) of the electrolyte and which are exposed outside the perimeter of the fuel cell 310. The anode and cathode electrodes block transmission of the UV radiation to any liquid seal material located under the active region of the fuel cell 310.

In an alternative embodiment, one or more of the fuel cell electrodes, such as the cathode electrode, may also be formed of a UV-transparent material. In this embodiment, the cathode may extend into the inactive region(s) of the fuel cell 310. For example, the cathode electrode may extend to the edges of the electrolyte, and the UV radiation is transmitted through both the cathode electrode and through the electrolyte to the liquid seal material underlying the inactive region(s) of the fuel cell 310 to cure the liquid seal material.

Figure 10:
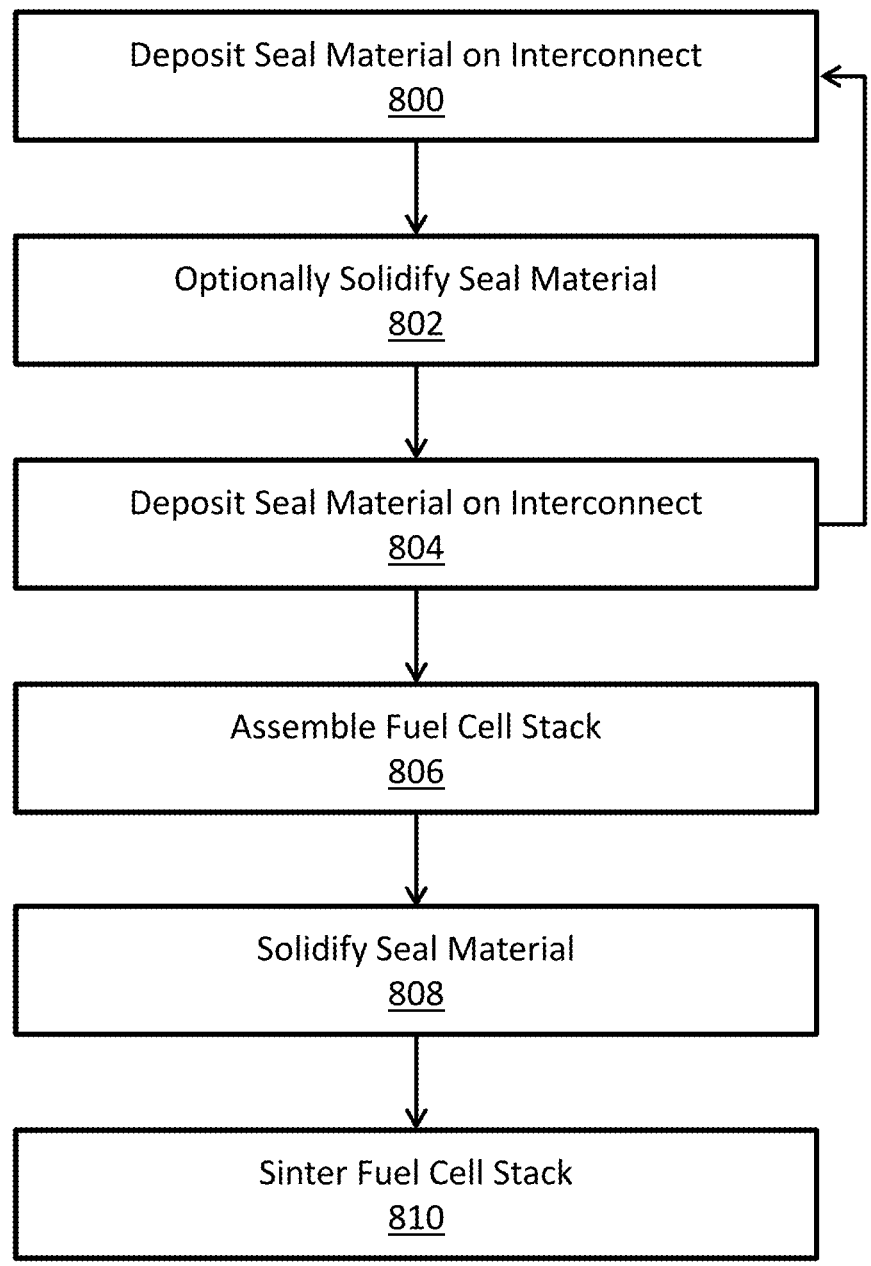
FIG. 10 is a flow diagram depicting a method of forming a fuel cell stack, according to a fourth embodiment of the present disclosure.

FIG. 10 is a flow diagram depicting a method of forming a fuel cell stack, according the fourth embodiment of the present disclosure. Referring to FIG. 10, in step 800, the method may include depositing a liquid (e.g., wet) seal material, such as a seal material ink, on a first side of an interconnect 400. For example, the seal material may be deposited on the air side of the interconnect to form riser seals, or may be deposited on the fuel side of the interconnect to form a perimeter seal. In some embodiments, the seal material may be a UV-curable seal material, as described above.

The method may optionally include step 802, where the seal material is solidified by drying and/or curing. For example, the seal material may be dried to remove the solvent and solidify the seal material. Alternatively or additionally, the seal material may be a UV-curable seal material, and the seal material may be cured by exposure to UV radiation. However, in other embodiments, step 802 may be omitted and the deposited seal material may remain in a liquid (e.g., wet) state (e.g., as an ink).

In step 804, the seal material is deposited on a second side of the interconnect 400. For example, if riser seals 424, 524 or 624 were formed in step 800, the seal material may be deposited on the fuel side of the interconnect to form a perimeter seal 434, 534 or 634. Alternatively, if the perimeter seal 434, 534 or 634 is formed in step 800, the seal material may be deposited on the air side of the interconnect to form the riser seals 424, 524 or 624. Steps 800-804 may be repeated to form seals on multiple interconnects, as shown by the arrow connecting steps 804 and 800.

In step 806, the interconnects 400 may be assembled with fuel cells 310 and arranged into a fuel cell stack 300 For example, a fuel cell 310 may be pressed against the liquid (e.g., wet) seal material, which may cause the wet seal material to flow around the fuel cell 310 to form the above described pocket region. In one embodiment, the interconnects 400 may be assembled with fuel cells 310 and arranged into a fuel cell stack 300 while the perimeter seals, the riser seals, or both, remain in the liquid (e.g., wet) state.

In some embodiments, the step 806 may include positioning a conductive layer (e.g., nickel mesh) 318 on the fuel side of each interconnect 400 and then screen printing the liquid seal material on the conductive layer 318 and the fuel cell side of each interconnect 400 to form the perimeter seal precursor layer. The fuel cell may then be pressed against the liquid seal material on the fuel side of the interconnect, such that the liquid seal material flows around the fuel cell and the fuel cell "bottoms out" against the conductive layer.

In step 808, the liquid seal material may then be solidified after the fuel cell 310 contacts the liquid seal material located on the interconnect 400. For example, the liquid seal material may be solidified by drying and/or curing after the fuel cells 310 and interconnects 400 are assembled into the fuel cell stack 300. Accordingly, the fuel cells may be more evenly supported, as compared to when a fuel cell is initially pressed against dried or cured seal material.

In step 810, the fuel cell stack is sintered and/or conditioned. In particular, the fuel cell stack may be heated to a temperature above the glass transition temperature of the seal material, such that the seals reflow around the fuel cells and seal the fuel cell stack.

Thus, in the fourth embodiment, a method of assembling a fuel cell stack includes depositing a liquid seal material on a first side (e.g., fuel side or air side) of an interconnect 400, pressing a fuel cell 300 into the liquid seal material located on the first side of the interconnect 400, and solidifying the liquid seal material located on the first side of the interconnect 400 after pressing the fuel cell 300 into the liquid seal material. The solidified liquid seal material may comprise any of the riser seals 424, 524 or 624 described above or any of the perimeter seals 434, 534 or 634 described above.

In one embodiment, pressing the fuel cell 310 into the liquid seal material comprises pressing the fuel cell against the liquid seal material such that the fuel cell creates a pocket region in the liquid seal material which surrounds at least part of edges of the fuel cell 310. The interconnect 400 comprises a cross-flow first interconnect comprising fuel holes that extend through the interconnect, fuel channels that extend in a first direction on a first side of the interconnect, and air channels that extend on a second side of the interconnect in a second direction substantially perpendicular to the first direction. The pocket region is configured to reduce an amount of compressive stress on corners of the fuel cell 310 in the fuel cell stack 300.

In one embodiment, the liquid seal material comprises a seal material ink containing a glass or glass ceramic seal material and a solvent. Solidifying the liquid seal material may comprise drying the seal material ink to evaporate the solvent. Alternatively, the seal material ink may further comprise a UV-curable binder, and solidifying the liquid seal material may comprise curing the seal material ink using UV radiation. The fuel cell may comprise a solid oxide fuel cell having a UV transparent electrolyte comprising an active region and an inactive region, a cathode disposed on a first side of the electrolyte, and an anode disposed in the active region on an opposing second side of the electrolyte, and the UV radiation is radiated through the inactive region of the UV transparent electrolyte to the seal material ink to cure the seal material ink. Optionally, the cathode is transparent to UV radiation and a portion of the cathode extends from the active region into the inactive region, and the UV radiation is radiated to the seal material ink through the inactive region of the UV transparent electrolyte and through the portion of the cathode which extends into the inactive region.

In one embodiment, the method of the fourth embodiment further comprises depositing a liquid seal material on a second side (e.g., air side) of the interconnect 400, solidifying the liquid seal material on the second side of the interconnect prior to pressing the fuel cell 310 into the liquid seal material located on the first side of the interconnect, and sintering the fuel cell stack 300 after solidifying the liquid seal material located on the first side of the interconnect.

While solid oxide fuel cell interconnects, end plates, and electrolytes are described above in various embodiments, embodiments can include any other fuel cell interconnects or end plates, such as molten carbonate, phosphoric acid or PEM fuel cell electrolytes, interconnects or end plates, or any other shaped metal or metal alloy or compacted metal powder or ceramic objects not associated with fuel cell systems.

The foregoing method descriptions are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not necessarily intended to limit the order of the steps; these words may be used to guide the reader through the description of the methods. Further, any reference to claim elements in the singular, for example, using the articles "a," "an" or "the" is not to be construed as limiting the element to the singular.

Further, any step or component of any embodiment described herein can be used in any other embodiment.

The preceding description of the disclosed aspects is provided to enable any person skilled in the art to make or use the present invention. Various modifications to these aspects will be readily apparent to those skilled in the art, and the generic principles defined herein may be applied to other aspects without departing from the scope of the invention. Thus, the present invention is not intended to be limited to the aspects shown herein but is to be accorded the widest scope consistent with the principles and novel features disclosed herein.

What is claimed is:

1. A method of assembling a fuel cell stack, comprising:
providing a cross-flow first interconnect comprising fuel holes that extend through the interconnect, fuel channels that extend in a first direction between fuel ribs on a fuel side of the interconnect, and air channels that extend on an air side of the interconnect between air ribs in a second direction substantially perpendicular to the first direction;
depositing a glass or glass ceramic seal material on the air side of the first interconnect to form riser seals that surround the fuel holes;
depositing the glass or glass ceramic seal material on the fuel side of the first interconnect to form a perimeter seal that surrounds the fuel channels and the fuel holes;
positioning a first side of a first fuel cell on the air side of the first interconnect in contact with at least a portion of the riser seals;
placing a cross-flow second interconnect into the fuel cell stack facing a second side of the first fuel cell;
positioning a second side of a second fuel cell on the fuel side of the first interconnect in contact with at least a portion of the perimeter seal;
placing a cross-flow third interconnect into the fuel cell stack facing a first side of the second fuel cell; and
sintering the fuel cell stack to reflow the riser seals and the perimeter seal, wherein the riser seals, the perimeter seal, or both the riser seals and the perimeter seal comprise at least one of at least one support portion or extensions that are formed of the glass or glass ceramic seal material and which are configured to reduce an amount of compressive stress on corners of at least one of the first or second fuel cells in the fuel cell stack, and wherein:

the riser seals comprise the support portions having a first thickness and base portions having a second thickness that is less than the first thickness;

the support portions at least partially define a pocket region; and positioning the first side of the first fuel cell comprises disposing the first side of the first fuel cell on the base portions in the pocket region, such that the first fuel cell is partially surrounded by the support portions and opposing edges of the first fuel cell contact the base portions.

2. The method of claim 1, wherein:
the second thickness ranges from about 25 microns to about 400 microns; and
the first thickness ranges from about 150 microns to about 850 microns.

3. The method of claim 1, wherein:
depositing the glass or glass ceramic seal material on the air side of the interconnect comprises using a dual emulsion screen printing process to form the riser seals; and
both the base portions and the support portions comprise the glass or glass ceramic seal material.

4. The method of claim 1, wherein:
the base portions comprise the glass or glass ceramic seal material;
the support portions each comprise a lower layer of the glass or glass ceramic seal material and an upper layer of a sacrificial material that lacks the glass or glass ceramic seal material; and
the sintering comprises burning off the sacrificial material of the upper layer.

5. A method of assembling a fuel cell stack, comprising:
providing a cross-flow first interconnect comprising fuel holes that extend through the interconnect, fuel channels that extend in a first direction between fuel ribs on a fuel side of the interconnect, and air channels that extend on an air side of the interconnect between air ribs in a second direction substantially perpendicular to the first direction;
depositing a glass or glass ceramic seal material on the air side of the first interconnect to form riser seals that surround the fuel holes;
depositing the glass or glass ceramic seal material on the fuel side of the first interconnect to form a perimeter seal that surrounds the fuel channels and the fuel holes;
positioning a first side of a first fuel cell on the air side of the first interconnect in contact with at least a portion of the riser seals;
placing a cross-flow second interconnect into the fuel cell stack facing a second side of the first fuel cell;
positioning a second side of a second fuel cell on the fuel side of the first interconnect in contact with at least a portion of the perimeter seal;
placing a cross-flow third interconnect into the fuel cell stack facing a first side of the second fuel cell; and
sintering the fuel cell stack to reflow the riser seals and the perimeter seal,
wherein the riser seals, the perimeter seal, or both the riser seals and the perimeter seal comprise at least one of at least one support portion or extensions that are formed of the glass or glass ceramic seal material and which are configured to reduce an amount of compressive stress on corners of at least one of the first or second fuel cells in the fuel cell stack, and wherein:

the perimeter seal comprises the support portion having a first thickness and base portion having a second thickness that is less than the first thickness;

the support portion at least partially defines a pocket region; and positioning the second side of the second fuel cell comprises disposing the second side of the second fuel cell on the base portion in the pocket region, such that the second fuel cell is partially surrounded by the support portion and opposing edges of the second fuel cell contact the base portion.

6. The method of claim 5, wherein:
the second thickness ranges from about 25 microns to about 400 microns; and
the first thickness ranges from about 150 microns to about 850 microns.

7. The method of claim 5, wherein:
depositing the glass or glass ceramic seal material on the fuel side of the interconnect comprises using a dual emulsion screen printing process to form the perimeter seal; and
both the base portion and the support portion comprise the glass or glass ceramic seal material.

8. The method of claim 5, wherein:
the base portion comprises the glass or glass ceramic seal material;
the support portion comprises a lower layer of the glass or glass ceramic seal material and an upper layer of a sacrificial material that lacks the glass or glass ceramic seal material; and
the sintering comprises burning off the sacrificial material of the upper layer.

9. The method of claim 5, wherein the riser seals each comprise extensions that extend across and partially cover portions of some of the air channels.

10. The method of claim 5, wherein the perimeter seal comprises the extensions that extend across and partially cover portions of some of the fuel channels.

11. The method of claim 5, further comprising:
solidifying the riser seals prior to positioning the first side of the first fuel cell on the air side of the first interconnect in contact with the riser seals; and
solidifying the peripheral seal prior to positioning the second side of the second fuel cell on the fuel side of the first interconnect in contact with the perimeter seal.

12. The method of claim 5, wherein the fuel holes comprise fuel inlet holes and fuel outlet holes.

* * * * *